United States Patent
Chida et al.

(10) Patent No.: US 8,641,939 B2
(45) Date of Patent: Feb. 4, 2014

(54) POROUS CARBON SHEET AND PROCESS FOR PRODUCTION THEREOF

(75) Inventors: Takashi Chida, Shiga (JP); Mikio Inoue, Shiga (JP); Kenya Okada, Shiga (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/401,739

(22) Filed: Feb. 21, 2012

(65) Prior Publication Data

US 2012/0153522 A1 Jun. 21, 2012

Related U.S. Application Data

(62) Division of application No. 12/066,875, filed as application No. PCT/JP2006/316708 on Aug. 25, 2006, now Pat. No. 8,142,883.

(30) Foreign Application Priority Data

Sep. 29, 2005 (JP) .................................. 2005-283731

(51) Int. Cl.
*C01B 31/00* (2006.01)

(52) U.S. Cl.
USPC ........... 264/29.1; 264/212; 264/213; 264/319

(58) Field of Classification Search
USPC .................................. 264/29.1, 212, 213, 319
See application file for complete search history.

(56) References Cited

U.S. PATENT DOCUMENTS

| | | | | |
|---|---|---|---|---|
| 4,434,206 A | * | 2/1984 | Fukuda et al. | 442/335 |
| 4,670,300 A | * | 6/1987 | Stewart, Jr. | 427/115 |
| 4,985,316 A | * | 1/1991 | Bose et al. | 429/532 |
| 5,578,255 A | * | 11/1996 | Okuyama et al. | 264/29.5 |
| 5,648,027 A | * | 7/1997 | Tajiri et al. | 264/43 |
| 6,182,171 B1 | * | 1/2001 | Akatsuka et al. | 710/100 |
| 6,489,051 B1 | * | 12/2002 | Inoue | 429/492 |
| 2004/0227265 A1 | * | 11/2004 | Nishida et al. | 264/29.1 |

FOREIGN PATENT DOCUMENTS

| | | |
|---|---|---|
| EP | 1139471 | 10/2001 |
| EP | 1139471 A1 * | 10/2001 |
| EP | 1539470 | 6/2005 |
| EP | 1612313 | 6/2012 |
| JP | 10-291869 | 11/1998 |
| JP | 2004-256959 | 9/2004 |

(Continued)

OTHER PUBLICATIONS

Table 1 of US 6,489,051 (Inoue) Dec. 2, 2002.*

(Continued)

*Primary Examiner* — Joseph S Del Sole
*Assistant Examiner* — David N Brown, II
(74) *Attorney, Agent, or Firm* — Pillsbury Winthrop Shaw Pittman, LLP

(57) ABSTRACT

A porous carbon sheet obtained by binding separate carbon short fibers with a carbonization product of a resin, wherein the pore mode diameter of the sheet is 45 to 90 μm and the mean fiber diameter of the carbon short fibers is 5 to 20 μm. The sheet can be produced by thermoforming a precursor fiber sheet comprising carbon short fibers of 15 to 30 g/m² in basis weight and a thermosetting resin of 30 to 80 g/m² in basis weight by hot plates having a certain clearance and carbonizing the thermosetting resin contained in thermoformed precursor fiber sheet.

13 Claims, 8 Drawing Sheets

(56) References Cited

FOREIGN PATENT DOCUMENTS

| | | |
|---|---|---|
| JP | 2004-311431 | 11/2004 |
| JP | 2006-264329 | 10/2006 |
| WO | 2004/085728 | 10/2004 |

OTHER PUBLICATIONS

Kenya et al, JP 2004-311431 machine translation, Apr. 11, 2004.

Supplementary European Search Report in related application EP06796781 mailed Oct. 6, 2010.

* cited by examiner

POROUS CARBON SHEET AND PROCESS FOR PRODUCTION THEREOF

CROSS REFERENCE TO RELATED APPLICATIONS

This application is a divisional of U.S. patent application Ser. No. 12/066,875, filed on Mar. 14, 2008 and now allowed on Nov. 21, 2011, which is a U.S. National Phase Application under 35 U.S.C. §371 of International Patent Application No. PCT/JP2006/316708 filed Aug. 25, 2006, which claims the benefit of Japanese Patent Application No. 2005-283731, filed Sep. 29, 2005, all of which are incorporated by reference herein in their entirety. The International Application was published in Japanese on Apr. 5, 2007 as WO/2007/037084 A1 under PCT Article 21(2).

TECHNICAL FIELD

The present invention relates to a porous carbon sheet. The porous carbon sheet of the invention comprises short carbon fibers and a carbonized resin, in which the short carbon fibers are bound by the carbonized resin. The invention also relates to a method for producing a porous carbon sheet.

The porous carbon sheet of the invention has many kinds of properties required as a carbon paper used as gas diffusion layers of a fuel cell. Hitherto, there has been no porous carbon sheet satisfying these many kinds of properties at once. Particularly the porous carbon sheet of the invention has all of high gas permeability, high conductivity and small residual deformation (residual strain) after compression in the thickness direction.

The porous carbon sheet of the invention can be preferably used as a material of construction of a gas diffusion layer in solid polymer fuel cell using for a motor vehicle.

BACKGROUND ART

A solid polymer fuel cell is supplied with hydrogen and oxygen, to generate power, and the power generation reaction produces water. As a material of construction of a gas diffusion layer constituting membrane-electrode assemblies that cause power generation reaction of a fuel cell, a carbon paper comprising carbon fibers bound by a carbonized resin is generally used. For applications requiring high power densities such as motor vehicles, the fuel cell is operated in a high current density range. So, the amount of water produced per unit reaction area also increases. Therefore, in such cases, how efficiently the water produced by the reaction should be discharged is important, and the carbon paper used as the material of construction of the gas diffusion layer of fuel cell is required to have a high gas permeability.

To address the above-mentioned problem, in Patent Document 1, a precursor fiber sheet decreased in the amount of a thermosetting resin to be impregnated into a carbon fiber paper is treated with heating and pressurizing at an appropriate pressure. In this production method, while the density of carbon fibers is maintained, the amount of the carbon used as a binder is decreased to lower the density of the carbon paper, for thereby enhancing the gas permeability in the thickness direction. However, if the amount of the carbon used as a binder is decreased, the binding points between the carbon fibers and the carbonized resin decrease to raise a problem that the resistivity of the carbon paper in the thickness direction increases. Therefore, in the carbon paper described in Patent Document 1, there is a tradeoff relation between the gas permeability in the thickness direction and the resistivity in the thickness direction, and it is difficult to satisfy both sufficiently.

On the other hand, in Patent Document 2, a precursor fiber sheet obtained by impregnating a carbon fiber paper sheet having a low unit area weight with graphite particles and a thermosetting resin is merely treated with heating instead of being treated with heating and pressurizing. Since a carbon paper obtained by the production method is higher in the density of highly conductive graphite particles though lower in the density of carbon fibers, the carbon paper has both low electric resistivity and high air permeability in the thickness direction. However, since the mechanical strength of the carbon paper greatly depends on the density of the carbon fibers contained in the carbon paper, the carbon paper described in Patent Document 2 has a problem that the residual deformation after compression in the thickness direction is large.

If a carbon paper having a large residual deformation after compression in the thickness direction is stacked in a fuel cell, it can happen that the carbon paper drops into grooves formed in a flow field plate and blocks gas passages and that the carbon paper diminishes in thickness, with lapse of time and reduces the conduction with the flow field plate. These can cause the fuel cell to decline in performance.

Further, in the carbon paper production method described in Patent Document 2 in which the precursor fiber sheet is not treated with heating and pressurization, the thickness of the obtained carbon paper is decided by any chance in the course of the mere heat treatment, depending on the composition and the unit area weight of the precursor fiber sheet. Therefore, it is difficult to appropriately control the thickness of the obtained carbon paper. Furthermore, the production method is not preferred either since the fluctuations in the composition and the unit area weight of the precursor fiber sheet directly lower the thickness accuracy of the carbon paper.

As described above, it is difficult for the prior art to provide carbon paper having all the properties of high gas permeability, high conductivity and small residual deformation after compression, which are required as a carbon paper used as a gas diffusion layer of a fuel cell.

The object of the invention is to provide a carbon paper having properties required as a carbon paper used as a gas diffusion layer of a fuel cell, particularly all of high gas permeability, high conductivity and small residual deformation after compression, though it is difficult for the prior art to provide such a carbon paper having all of the properties.

Patent Document 1: JP 9-157052 A
Patent Document 2: JP 2004-31326 A

DISCLOSURE OF THE INVENTION

Problem to be Solved by the Invention

To achieve the object of the present invention, attention was paid to a pore size in a carbon paper, and it was found that if the pore size is controlled in an appropriate range, a carbon paper excellent in all of gas permeability in the thickness direction, conductivity and residual deformation after compression can be obtained, though it is difficult for the prior art to provide such carbon paper.

Further, in the invention, a precursor fiber sheet containing short carbon fibers and a thermosetting resin is formed between hot plates having a certain clearance provided between the hot plates in a forming step of the precursor fiber sheet with a heating and forming treatment, to appropriately control the pore size in the obtained carbon paper.

Means for Solving the Problem

A porous carbon sheet of the invention is a porous carbon sheet comprising dispersed short carbon fibers bound by a carbonized resin, in which a pore mode diameter of pores in the sheet is in the range of 45 to 90 μm and an average fiber diameter of the short carbon fibers is in the range of 5 to 20 μm.

In the porous carbon sheet of the invention, it is preferred that a differential pressure with air permeated through in the thickness direction of the sheet at 14 cm$^3$/cm$^2$/sec is in the range of 1 to 10 mm Aq/mm.

In the porous carbon sheet of the invention, it is preferred that an electrical resistivity in the thickness direction of the sheet is in the range of 30 to 300 mΩ·cm.

In the porous carbon sheet of the invention, it is preferred that a residual deformation (residual strain) by compression in the thickness direction of the sheet is in the range of 3 to 15 μm.

In the porous carbon sheet of the invention, it is preferred that a density of the sheet is in the range of 0.15 to 0.35 g/cm$^3$.

In the porous carbon sheet of the invention, it is preferred that a thickness of the sheet is in the range of 100 to 250 μm.

In the porous carbon sheet of the invention, it is preferred that a carbonaceous powder is contained in the sheet.

A method for producing a porous carbon sheet of the invention, which comprises the steps of:
forming a precursor fiber sheet containing short carbon fibers and a thermosetting resin, with a heat and forming treatment, and
carbonizing the thermosetting resin contained in a heated and formed precursor fiber sheet formed by the forming step, with a heat treatment,
wherein a unit area weight of the short carbon fibers in the precursor fiber sheet is in the range of 15 to 30 g/m$^2$ and a unit area weight of the thermosetting resin in the precursor fiber sheet is in the range of 30 to 80 g/m$^2$, and
wherein, in the forming step, the precursor fiber sheet is formed by hot plates having a certain clearance provided between the hot plates.

In the method for producing a porous carbon sheet of the invention, it is preferred that the forming step comprises a heating and pressurizing treatment step using a pair of hot plates positioned to be parallel to each other.

In the method for producing a porous carbon sheet of the invention, it is preferred that the clearance is formed with spacers disposed in contact with at least one of the hot plates.

In the method for producing a porous carbon sheet of the invention, it is preferred that the precursor fiber sheet is carried intermittently into a space between the hot plates in the forming step and that while the carrying is suspended, the precursor fiber sheet is treated with heating and pressurizing using the hot plates.

In the method for producing a porous carbon sheet of the invention, it is preferred that the forming step is a step in which the precursor fiber sheet is heated and formed while it is continuously guided into a die having a heater and a slit, with both the surfaces of the sheet held between a pair of belts.

In the method for producing a porous carbon sheet of the invention, it is preferred that the slit of the die is formed by spacers held between a pair of metal blocks.

In the method for producing a porous carbon sheet of the invention, it is preferred that the pair of belts has lubricant layers on the surfaces brought into contact with the die.

In the method for producing a porous carbon sheet of the invention, it is preferred that the slit of the die has lubricant layers on the surfaces brought into contact with the pair of belts.

In the method for producing a porous carbon sheet of the invention, it is preferred that the pair of belts is endless belts.

In the method for producing a porous carbon sheet of the invention, it is preferred that tension transmitting portions are installed at both the edges of the surfaces in contact with the die, of the endless belts over the entire circumference.

In the method for producing a porous carbon sheet of the invention, it is preferred that a ratio of the weight of thermosetting resin to the weight of the short carbon fibers in the precursor fiber sheet supplied to the forming step is in the range of 1 to 3.

In the method for producing a porous carbon sheet of the invention, it is preferred that the clearance in the forming step is set to ensure that a density of the short carbon fibers becomes so in the range of 0.05 to 0.10 g/cm$^3$ while a density of the thermosetting resin becomes in the range of 0.10 to 0.27 g/cm$^3$ respectively in the precursor fiber sheet after the heat and forming treatment in the forming step.

In the method for producing a porous carbon sheet of the invention, it is preferred that an average fiber diameter of the short carbon fibers in the precursor fiber sheet supplied to the forming step is in the range of 5 to 20 μm.

In the method for producing a porous carbon sheet of the invention, it is preferred that the precursor fiber sheet supplied to the forming step contains a carbonaceous powder.

In the method for producing a porous carbon sheet of the invention, it is preferred that in the carbonizing step, the precursor fiber sheet is continuously run in a heating furnace internally kept in an inert atmosphere and heated at least up to 1,200° C. at a heating rate in the range of 100 to 10,000° C./min in the heating furnace, to carbonize the thermosetting resin while heat-treating the precursor fiber sheet in the heating furnace, and that the porous carbon sheet obtained after completion of the carbonizing step is wound as a roll.

In the method for producing a porous carbon sheet of the invention, it is preferred that a bending member for bending the precursor fiber sheet in the longitudinal direction while the precursor fiber sheet is run is installed in the heating furnace in the carbonizing step, so that the precursor fiber sheet can be run in contact with the bending member.

In the method for producing a porous carbon sheet of the invention, it is preferred that a temperature in the heating furnace having the bending member installed therein is in the range of 400 to 2,700° C.

In the method for producing a porous carbon sheet of the invention, it is preferred that the heating furnace having the bending member installed therein is a heating furnace having a temperature region in the range of 400 to 800° C.

In the method for producing a porous carbon sheet of the invention, it is preferred that the heating furnace having the bending member installed therein is a heating furnace having a temperature region in the range of 1,600 to 2,700° C.

In the method for producing a porous carbon sheet of the invention, it is preferred that when the precursor fiber sheet is run while it is bent by the bending member in the longitudinal direction, the bending angle is in the range of 5 to 25°.

In the method for producing a porous carbon sheet of the invention, it is preferred that both of the front and rear surfaces of the precursor fiber sheet are brought into contact with the bending members one after another, so that both of the surfaces of the precursor fiber sheet receive bending.

The definitions and/or the measuring methods of respective characteristic values of the porous carbon sheet of the invention are as follows.

(a) Pore Mode Diameter of the Pores of a Porous Carbon Sheet:

A pore size distribution of a porous carbon sheet was obtained from the distribution measurement by a mercury penetration method described below. A pore mode diameter of the pores of a porous carbon sheet was obtained based on the measured pore size distribution.

Three specimens of about 12 mm×20 mm square were cut out of a porous carbon sheet, and they were accurately weighed and placed in a measuring cell not to overlap each other. Mercury was penetrated under reduced pressure to measure the pore size distribution using the following instrument under the following conditions. The number of measuring times was one. In the measured pore size distribution, the pore size of the largest rate is the pore mode diameter.

Instrument: Pore sizer 9320 produced by Micromeritics Co., Ltd.

Conditions:

Measuring pressure range: About 3.7 KPa to 207 MPa (pore diameter about 70 nm to 400 μm)

Measuring mode: Pressure raising process in the above pressure range

Cell volume: 5 cm$^3$ (b) Average Fiber Diameter of Short Carbon Fibers:

From a side-view photograph of fibers of a porous carbon sheet taken by an electron microscope under magnification of 5,000, arbitrary 20 short carbon fibers were selected, and their fiber diameters were measured and averaged to obtain a mean value. Further, if the carbonized resin portion of the electron microscope photograph is observed, the presence or absence of a carbonaceous powder can be confirmed.

(c) Differential Pressure with Air Permeated Through a Porous Carbon Sheet in the Thickness Direction:

Air was permeated through a porous carbon sheet in the thickness direction at 14 cm$^3$/cm$^2$/sec, and the differential pressure was measured. It was divided by the thickness of the porous carbon sheet. The method for measuring the thickness of a porous carbon sheet is described later.

(d) Electrical Resistivity of a Porous Carbon Sheet in the Thickness Direction:

A porous carbon sheet was held between mercury electrodes having a certain area, and a certain current was made to flow between the electrodes for measuring the voltage drop. Based on the voltage drop, the electrical resistivity was calculated from the following formula (I).

$$\text{Resistivity in the thickness direction } (m\Omega \cdot cm) = (V \times S)/(I \times d) \quad (I)$$

where V: Voltage drop (mV)

I: Current (A)

d: Thickness of the porous carbon sheet (cm)

S: Area of the mercury electrodes (cm$^2$)

In the above, a current of 1 A was made to flow between the electrodes, and the mercury electrodes used were circular having a diameter of 3 cm. The method for measuring the thickness of a porous carbon sheet is described later.

(e) Thickness of a Porous Carbon Sheet:

A micrometer having a probe circular with a diameter of 5 mm in its cross sectional form was used, and a pressure of 0.15 MPa was applied in the thickness direction of the sheet for measurement. Measuring points were lattice points of 1.5 cm intervals. The number of measuring times was 20 or more, and the mean value was employed as the thickness.

(f) Residual Deformation of a Porous Carbon Sheet by Compression in the Thickness Direction:

The above-mentioned micrometer was used to measure the thickness $d_1$ of a porous carbon sheet with a pressure of 0.33 MPa applied in the thickness direction of the porous carbon sheet. Then, the application of a pressure of 1.60 MPa in the thickness direction of the sheet and depressurization were repeated twice, and with a pressure of 0.33 MPa applied, the thickness $d_2$ of the sheet was measured. The residual deformation was obtained from the following formula (II). The number of measuring times was three, and the mean value was employed as the residual deformation by compression.

$$\text{Residual deformation by compression} = d_1 - d_2 \quad (II)$$

(g) Unit Area Weight of a Porous Carbon Sheet (Weight Per Unit Area):

Ten sample sheets each of which has a 10 cm×10 cm square were cut out from a porous carbon sheet and measured each weight thereof. The unit area weight of the porous carbon sheet was determined with the mean value of the measured weights.

(h) Unit Area Weight of Short Carbon Fibers:

The unit area weight of short carbon fibers was measured as described for a porous carbon sheet, except that the short carbon fiber sheet not yet impregnated with the thermosetting resin was heated at 400° C. in air for 8 hours, to thermally decompose the binder, etc. other than the short carbon fibers.

(i) Unit Area Weight of a Thermosetting Resin:

The unit area weight of a thermosetting resin was calculated from the unit area weight of a short carbon fiber sheet not yet impregnated with the resin and the unit area weight of the short carbon fiber sheet impregnated with the resin.

The unit area weight of the short carbon fiber sheet impregnated with the resin was measured after heat-treating at 160° C. for 5 minutes to cure the resin.

(j) Density of a Porous Carbon Sheet:

The density refers to a bulk density. It was calculated from the above-mentioned thickness of a porous carbon sheet and the above-mentioned unit area weight of the porous carbon sheet.

(k) Ratio of the Weight of a Thermosetting Resin to the Weight of the Short Carbon Fibers:

The ratio of the above-mentioned unit area weight of a thermosetting resin to the above-mentioned unit area weight of the short carbon fibers was calculated.

(l) Density of the Short Carbon Fibers and the Density of the Thermosetting Resin, Respectively Contained in a Precursor Fiber Sheet after Heating and Forming Treatment in the Forming Step:

They were calculated from the above-mentioned unit area weights of the short carbon fibers and the thermosetting resin contained in a precursor fiber sheet after completion of heating and forming treatment and the thickness of the precursor fiber sheet. The thickness of the precursor fiber sheet was measured as described for the thickness of a porous carbon sheet.

(m) Heating Rate for Heat-Treating a Precursor Fiber Sheet:

The temperature at the inlet of a heating furnace, the highest temperature in the heating furnace and the time taken for the sheet introduced into the inlet of the heating furnace to reach the highest temperature region (moving time) were measured to obtain the heating rate from the following formula (III). The inlet of the heating furnace refers to, the site on the inlet side of the heating furnace at which the atmosphere changes from air to an inert atmosphere.

$$V = (T2 - T1)/t$$

where V is the heating rate (° C./min); T1 is the temperature (° C.) at the inlet of the heating furnace; T2 is the highest temperature (° C.) in the heating furnace; and t is the moving time (min).

Meanwhile, it is not necessary to use only one heating furnace, and multi-stage heat-treating using two or more heating furnaces can also be performed. In the case where two heating furnaces are used, the heating rate of the first heating furnace is obtained from the formula (III), and the heating rate of the second heating furnace is obtained from the formula (III) where T1 is the highest temperature of the previous heating furnace, namely, the highest temperature of the first heating furnace. Also in the case where three or more heating furnaces are used, similar calculation can be made.

(n) Bending Angle of a Precursor Fiber Sheet:

The bending angle of a running precursor fiber sheet refers to the angle formed between the progress direction of the precursor fiber sheet at the position at which the running precursor fiber sheet contacts a bending member and the progress direction of the precursor fiber sheet at a position at which the precursor fiber sheet is leaving from the bending member. Straight running is expressed by 0°, and a U turn is expressed by 180°.

THE BEST MODES FOR CARRYING OUT THE INVENTION

Figure 2:
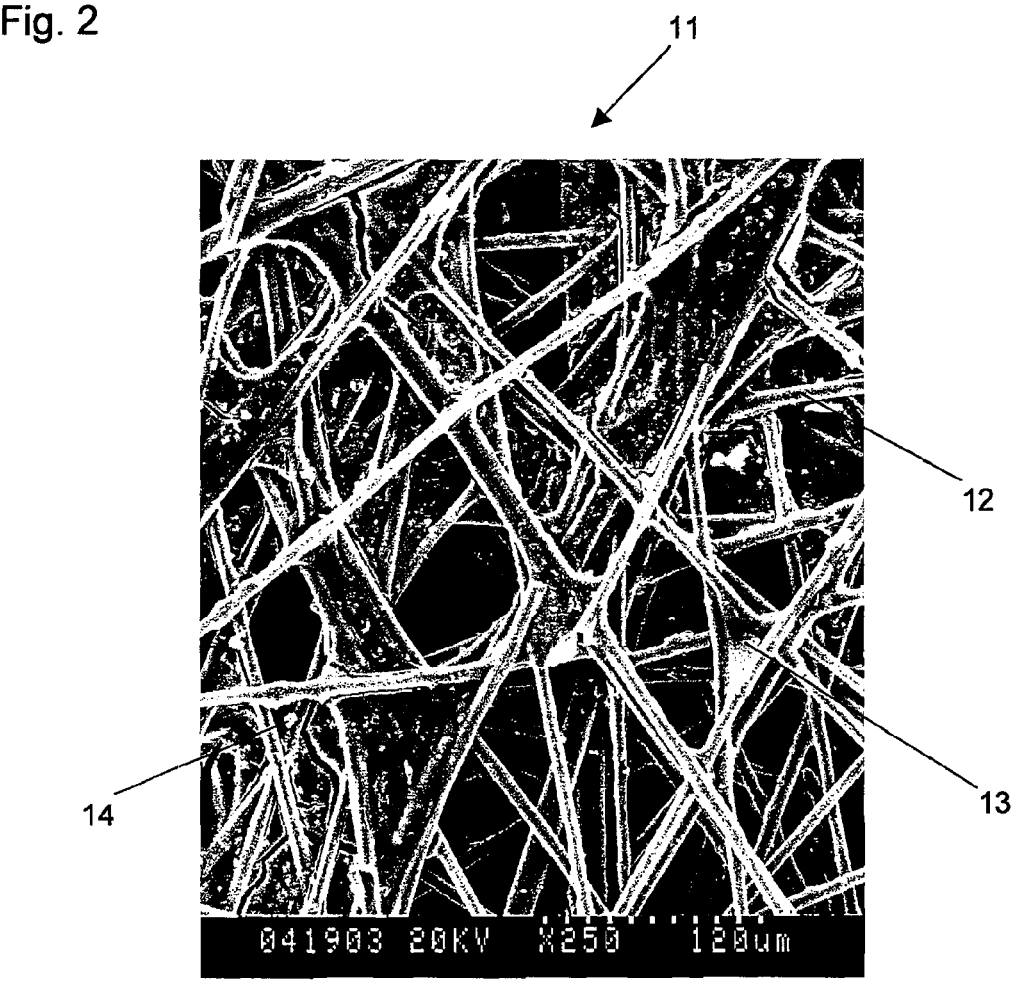
FIG. 2 is an electron microscope photograph (magnification 250×) showing a surface of the porous carbon sheet of an example of the invention.
Figure 3:
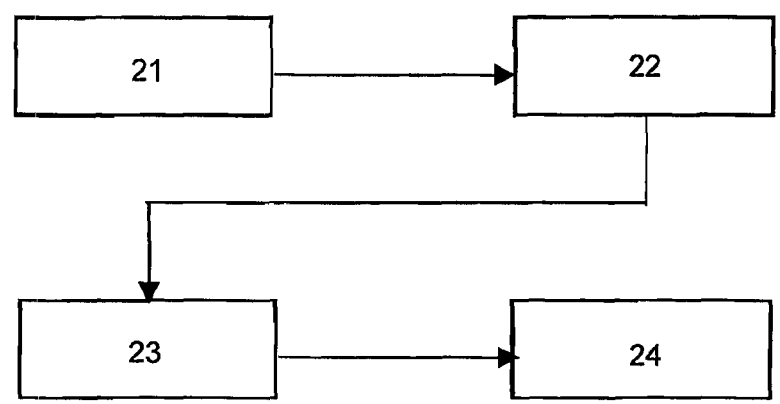
FIG. 3 is a process chart showing a mode of the production process used for carrying out a porous carbon sheet production method of the invention.
Figure 4:
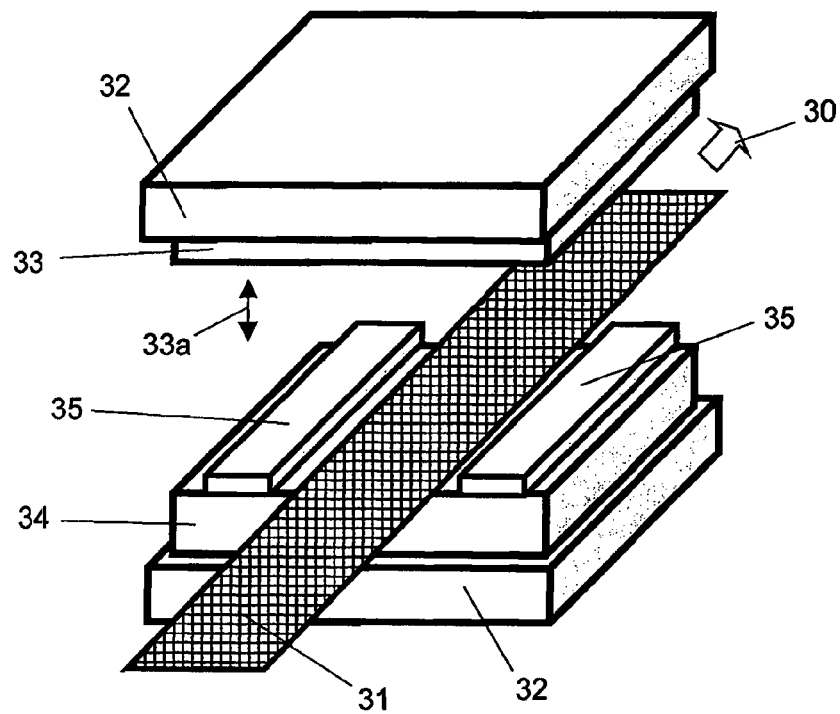
FIG. 4 is a schematic perspective view showing a forming apparatus used in a mode of the forming step (a first forming method) for carrying out a porous carbon sheet production method of the invention.

FIG. 2 is an electron microscope photograph showing a surface of the porous carbon sheet 11 of an example of the invention. FIG. 3 shows a mode of the process for producing the porous carbon sheet 11 shown in FIG. 2. FIG. 4 shows a mode of the forming step 23 in the production process shown in FIG. 3.

In FIG. 2, the porous carbon sheet 11 of the invention comprises numerous short carbon fibers 12 dispersed like lines and a carbonized resin 13 binding the short carbon fibers 12. The porous carbon sheet 11 has carbonaceous powder particles 14 dispersed in the carbonized resin 13.

A dispersed state of the short carbon fibers 12 means that the short carbon fibers 12 exist in random directions without being oriented remarkably in any certain direction within the plane of the porous carbon sheet 11. As a particular example, short fibers are dispersed as in the short fiber sheet produced by the paper making technique described later.

The porous carbon sheet 11 of the invention is characterized in that a pore mode diameter of pores in the sheet 11 is in the range of 45 to 90 μm and that an average fiber diameter of the short carbon fibers 12 is in the range of 5 to 20 μm.

The pore size of the carbon paper (porous carbon sheet 11) is decided by the carbon fibers forming the structural skeleton of the carbon paper, and in the case where a density at which carbon fibers exist per unit volume in the carbon paper is high, the pore size is small, and in the case where a density at which carbon fibers exist per unit volume is low, the pore size is large.

Considering from this point of view, the carbon paper described in Patent Document 1 is high in the density at which carbon fibers exist per unit volume, namely, small in pore size. Therefore, it can be considered that though a deformation by compression in the thickness direction is small, there is a tradeoff relation between a gas permeability in the thickness direction and a resistivity in the thickness direction.

On the other hand, the carbon paper described in Patent Document 2 is low in a density at which carbon fibers exist per unit volume, namely, large in pore size. Therefore, it can be considered that though the carbon paper has both low electric resistivity and high air permeability in the thickness direction, the deformation by compression in the thickness direction is large.

In the invention, attention was paid to the pore size of carbon paper, and it was found that if the pore size is controlled in an appropriate range, carbon paper excellent in all of the gas permeability in the thickness direction, conductivity and the deformation by compression can be obtained, though it was difficult to obtain such carbon paper according to the prior art.

Since the pore mode diameter of the pores of the porous carbon sheet 11 of the invention is controlled in a range from 45 to 90 μm by a production method described later, the porous, carbon sheet can have all of the properties required as a carbon paper used as a gas diffusion layers of fuel cell, particularly high gas permeability, high conductivity and small residual deformation after compression, though it was difficult for the conventional carbon paper to have all of those properties.

If the pore mode diameter is less than 45 μm, the residual deformation by compression in the thickness direction is small, but there is a tradeoff relation between the gas permeation resistance in the thickness direction and the electrical resistivity in the thickness direction. If the pore mode diameter is more than 90 μm, the gas permeation resistance in the thickness direction and the electrical resistivity in the thickness direction become small, but the residual deformation by compression in the thickness direction becomes large.

It is preferred that the pore mode diameter of the porous carbon sheet 11 is in the range of 50 to 80 μm. A more preferred range is 55 to 70 μm, and a further more preferred range is 55 to 65 μm.

Figure 1:
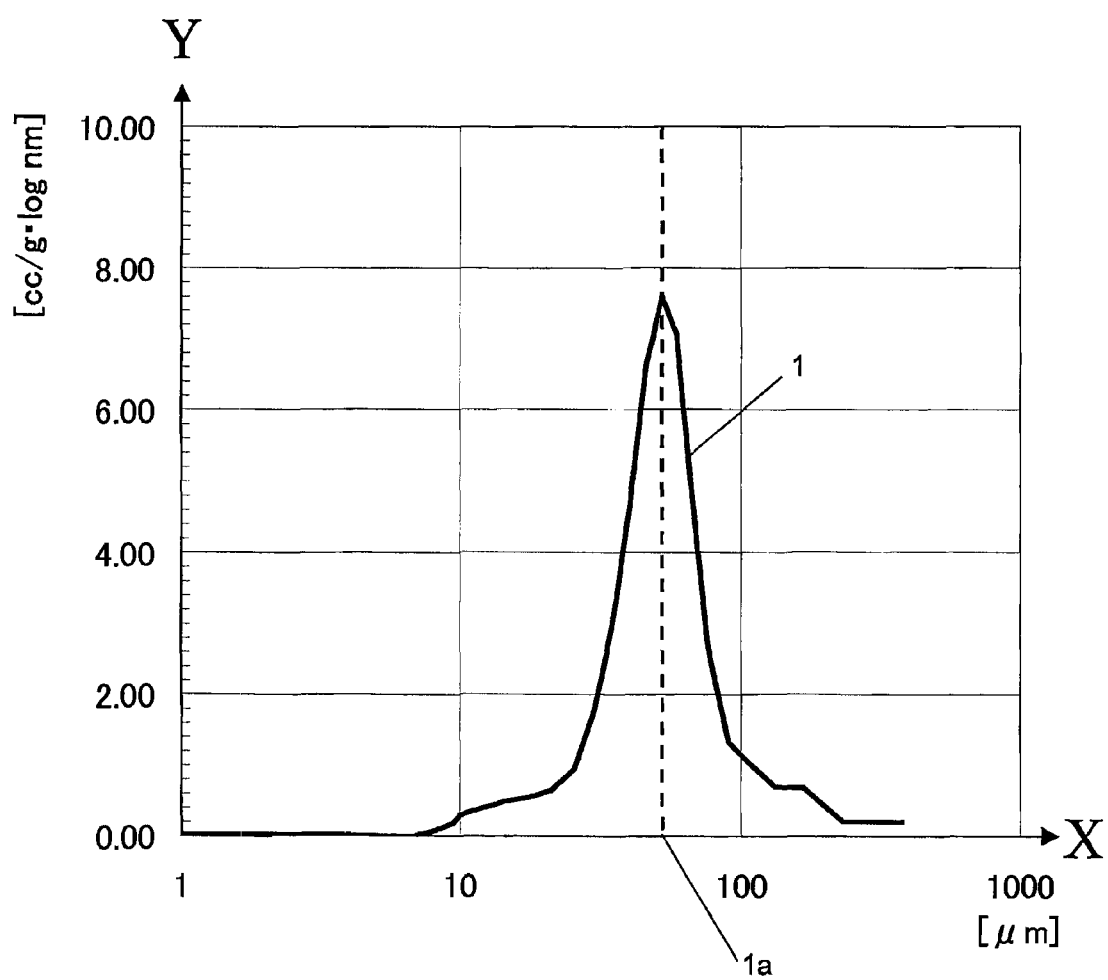
FIG. 1 is a graph showing the pore size distribution of the porous carbon sheet of an example of the invention (the porous carbon sheet shown in FIG. 2).

The results of measuring the pore size of the porous carbon sheet 11 by the mercury penetration method are shown in FIG. 1 as an example. In the graph of FIG. 1, the axis of abscissas X shows the pore size (μm), and the axis of ordinates X shows the differential value of the pore volume (cc/g·log nm), namely, the rate of the pores of each pore size. In the graph of FIG. 1, curve 1 expresses the rate of the pores (axis of ordinates X) of each pore size (axis of abscissas X) in the porous carbon sheet 11. In the curve 1 expressing the rate of the pores of each pore size in the porous carbon sheet 11, the pore size at the point at which the differential value of the pore volume becomes largest (the position 1a indicated by a dot line on the axis of abscissas X) is the pore mode diameter.

An average fiber diameter of the short carbon fibers 12 constituting the porous carbon sheet 11 is in the range of 5 to 20 μm for obtaining a suitable pore mode diameter. It is preferred that the average fiber diameter of the short carbon fibers 12 is in the range of 6 to 13 μm, and a more preferred range is 6 to 10 μm.

As the carbon fibers constituting the short carbon fibers 12, polyacrylonitrile (PAN)-based carbon fibers, pitch-based carbon fibers, rayon-based carbon fibers, etc. can be used. Among them, it is preferred to use PAN-based carbon fibers and pitch-based carbon fibers, especially PAN-based carbon fibers, since a porous carbon sheet having excellent mechanical strength, and further, appropriate flexibility and excellent handling properties can be obtained.

It is preferred that a differential pressure with air permeated though the porous carbon sheet 11 in the thickness direction at 14 cm$^3$/cm$^2$/sec is in the range of 1 to 10 mm Aq/mm. A more preferred range is 2 to 9 mm Aq/mm, and a further more preferred range is 3 to 8 mm Aq/mm.

If the differential pressure is 10 mm Aq/mm or less, the decline of cell performance caused by clogging with pro-duced water can be prevented in the case where a fuel cell is operated at a high power density. If the differential pressure is 1 mm Aq/mm or more, a decline of proton conductivity by drying of a solid polymer electrolyte membranes can be prevented.

It is preferred that an electrical resistivity of the porous carbon sheet 11 in the thickness direction is 300 mΩ·cm or less. More preferred is 200 mΩ·cm or less, and further more preferred is 150 mΩ·cm or less.

If the electrical resistivity is 300 mΩ·cm or less, decline of cell performance due to the ohm loss of a gas diffusion layer can be inhibited. If the electrical resistivity in the thickness direction is smaller, the ohm loss can be decreased more, but in view of the porous structure in which the short carbon fibers are bound by the carbonized resin, about 30 mΩ·cm is the limit.

It is preferred that a residual deformation of the porous carbon sheet 11 by compression in the thickness direction is 15 μm or less. More preferred is 12 μm or less, and further more preferred is 8 μm or less.

In general, a gas diffusion layer using a porous carbon sheet as the substrate is bonded to a solid polymer electrolyte membrane with catalyst layers on both sides, to form a membrane-electrode assembly. Further, the membrane-electrode assembly is held between a pair of gaskets and further outside between a pair of flow field plates having grooves formed as gas passages necessary for reaction. Plural sets each as described here are laminated to constitute a solid polymer fuel cell.

If the residual deformation of the porous carbon sheet by compression in the thickness direction is larger than 15 μm, it can happen that the gas diffusion layers with the porous carbon sheets as substrates drop into the grooves formed in the flow field plates, to block the gas passages, or that the gas diffusion layers diminish in thickness with the lapse of time to reduce the conduction with the flow field plates. These can cause the fuel cells to decline in performance. Meanwhile, the porous carbon sheet 11 is a porous material, and even if the residual deformation by compression in the thickness direction can be decreased, residual deformation of about 3 μm is the limit.

It is preferred that a density of the porous carbon sheet 11 is in the range of 0.15 to 0.35 g/cm$^3$. A more preferred range is 0.18 to 0.32 g/cm$^3$, and a further more preferred range is 0.20 to 0.30 g/cm$^3$.

If the density is 0.35 g/cm$^3$ or less, the void of the porous carbon sheet 11 increases to enhance the gas permeability. So, in the case where fuel cell is operated at a high power density, the decline of cell performance caused by clogging with produced water can be prevented. If the density is 0.15 g/cm$^3$ or more, it can be prevented that the gas permeability increases so much as to dry the solid polymer electrolyte membranes, for lowering the proton conductivity.

It is preferred that a thickness of the porous carbon sheet 11 is in the range of 100 to 250 μm. A more preferred range is 110 to 240 μm, and a further more preferred range is 120 to 230 μm. The thickness of the porous carbon sheet 11 relates to cracking and flexibility of the porous carbon sheet 11 caused when a shearing force acts.

In the case where the thickness is less than 100 μm, when a porous carbon sheet receives a shearing force from a flow field plate in a fuel cell prepared by using gas diffusion layers with porous carbon sheets as substrates, the porous carbon sheet is easily broken. Further, in the case where the thickness is more than 250 μm, the porous carbon sheet significantly declines in flexibility, and the winding of the porous carbon sheet as a roll described later becomes difficult.

It is preferred that the porous carbon sheet 11 contains a carbonaceous powder 14. If the porous carbon sheet 11 contains the carbonaceous powder 14, the conductivity of the porous carbon sheet 11 per se can be enhanced, and in the continuous carbonizing step 24 described later, the cracking of the carbonized resin caused by sudden carbonization contraction of the thermosetting resin can be inhibited. It is preferred that the average particle size of the carbonaceous powder 14 is in the range of 0.01 to 10 µm. A more preferred range is 1 to 8 µm, and a further more preferred range is 3 to 6 µm. It is preferred that the carbonaceous powder 14 is a powder of graphite or carbon black, and more preferred is graphite powder. The average particle size of the carbonaceous powder 14 can be obtained by averaging the particle sizes of the powder 14 confirmed from an electron microscope photograph showing a surface of the porous carbon sheet 11.

FIG. 3 shows a mode of the porous carbon sheet production process of the invention. In FIG. 3, the porous carbon sheet production process comprises a paper making step 21 for forming a short carbon fiber sheet, a resin impregnation step 22 for impregnating the formed short carbon fiber sheet with a thermosetting resin, a forming step 23 for treating the short carbon fiber sheet impregnated with the resin (precursor fiber sheet) for heating and forming it, and a carbonizing step 24 for heat-treating the thermosetting resin contained in the heated and formed precursor fiber sheet for carbonizing it.

In the porous carbon sheet production process of the invention, in the precursor fiber sheet, the unit area weight of the short carbon fibers is in the range of 15 to 30 g/cm$^2$, and the unit area weight of the thermosetting resin is in the range of 30 to 80 g/cm$^2$. Further, in the forming step 23, the precursor fiber sheet is subjected to heating and forming treatment using hot plates having a certain clearance provided between them.

In the porous carbon sheet production method of the invention, the pore mode diameter of the porous carbon sheet of the invention is controlled in an appropriate range. As a result, the porous carbon sheet 11 of the invention excellent in all of the gas permeability in the thickness direction, conductivity and residual deformation after compression can be produced, though it was difficult to produce such a sheet according to the prior art.

It can be considered that the pore size of the porous carbon sheet can be controlled by adjusting the pressure applied when the precursor fiber sheet obtained by impregnating a carbon fiber paper sheet with a thermosetting resin is treated with heating and pressurization. For example, it can be considered that the carbon paper described in Patent Document 1 has a small pore size, since a precursor fiber sheet obtained by impregnating a thermosetting resin into a carbon fiber paper sheet with a high unit area weight is pressed at an appropriate pressure.

On the other hand, it can be considered that a large pore size can be obtained, if a precursor fiber sheet obtained by impregnating a thermosetting resin into a carbon fiber paper sheet with a low unit area weight is treated with heating and pressurization at a low pressure. However, if such a precursor fiber sheet not yet treated with heating and pressurization is treated with heating and pressurization even at a low pressure, it greatly changes in thickness. So, it is considered difficult to obtain an intended thickness by simple treatment with heating and pressurization at a low pressure.

Therefore, it is considered that the carbon paper described in Patent Document 2 is made to have a large pore size by merely heat-treating a precursor fiber sheet obtained by impregnating graphite particles and a thermosetting resin into a carbon fiber paper sheet with a low unit area weight, without treating with heating and pressurization. However, according to the production method in which no treatment with heating and pressurization is performed, the thickness of the obtained carbon paper is decided by any chance depending on the composition and unit area weight of the precursor fiber sheet, and it is difficult to appropriately control the thickness of the obtained carbon paper. This production method is not preferred either, since the fluctuations in the composition and unit area weight of the precursor fiber sheet directly lower the accuracy in the thickness of the carbon paper.

The porous carbon sheet production method of the invention is based on the finding that the pore size of the porous carbon sheet can be adequately controlled, though this is difficult to achieve according to the prior art, if a precursor fiber sheet containing short carbon fibers and a thermosetting resin is formed using hot plates having a certain clearance provided between them in the forming step 23 of treating with heating and forming.

The precursor fiber sheet can be produced by the paper making step 21 and the resin impregnation step 22 shown in FIG. 3.

In the paper making step 21, short carbon fibers cut to a suitable length are uniformly dispersed in water, and dispersed short carbon fibers are picked up on a wire cloth to produce a carbon fiber sheet. The picked up short carbon fiber sheet is immersed in an aqueous polyvinyl alcohol dispersion, and the immersed sheet is raised for drying. The polyvinyl alcohol acts as a binder for binding the short carbon fibers to each other, and in the state where the short carbon fibers are dispersed, a short carbon fiber sheet having them bound by a binder can be produced.

In the resin impregnation step 22, the short carbon fiber sheet produced in the paper making step 21 is immersed in a thermosetting resin solution, and the immersed sheet is raised and dried at 90° C. for 3 minutes, to produce a precursor fiber sheet.

In the resin impregnation step 22, a carbonaceous powder can be dispersed in the thermosetting resin solution, to let the porous carbon sheet 11 contain the carbonaceous powder 14.

It is preferred that the amount of the carbonaceous powder is in the range of 5 to 100 parts by weight per 100 parts by weight of the resin. A more preferred range is 10 to 90 parts by weight, and a further more preferred range is 15 to 70 parts by weight. It is not preferred that the amount of the carbonaceous powder is smaller than 5 parts by weight, since the cracking of the carbonized resin 13 due to the sudden carbonization contraction of the thermosetting resin increases in the continuous carbonizing step 24 described later. It is not preferred either that the amount of the carbonaceous powder is larger than 100 parts by weight, since the thermosetting resin required for binding the carbonaceous powder increases to decrease the amount of the thermosetting resin used for binding the short carbon fibers.

In the forming step 23, the precursor fiber sheet is treated with heating and forming using hot plates having a certain clearance provided between them. FIG. 4 is a schematic perspective view showing an example of a forming apparatus used for performing a first forming method as a mode of the forming step 23 in a porous carbon sheet production process of the invention. In the first forming method, a hot press 32 is used.

In FIG. 4, a hot press 32 has an upper hot plate 33 and a lower hot plate 34. The upper hot plate 33 and/or the lower hot plate 34 can move in the vertical direction, and a moving mechanism for the movement is not, shown in the drawing. In the hot press 32 shown in FIG. 4, the lower hot plate 34 is fixed, and the upper hot plate 33 can move vertically relatively to the lower hot plate 34 as indicated by the arrow 33a. A precursor fiber sheet 31 is positioned between the bottom surface of the upper hot plate 33 and the top surface of the lower hot plate 34. The precursor fiber sheet 31 positioned between the bottom surface of the upper hot plate 33 and the top surface of the lower hot plate 34 is held between the bottom surface of the upper hot plate 33 and the top surface of the lower hot plate 34 if the upper hot plate 33 descends.

In the first forming method, a certain clearance formed between the hot plates can be established by two techniques. According to the first technique, the moving stroke of the movable upper hot plate 33 to the lower hot plate 34 can be adjusted to establish a desired clearance. According to the second technique, fixed or exchangeable spacers 35 are placed on the top surface of the lower hot plate 34 on both sides outside the positioned precursor fiber sheet 31, and the bottom surface of the movable upper hot plate 33 contacts the top surfaces of the spacers 35, to establish a desired clearance. The spacers 35 can also be installed on the bottom surface of the upper hot plate 33, instead of being installed on the top surface of the lower hot plate 34. In view of accuracy of the clearance established between the hot plates, the second technique of using the spacers 35 is preferred.

As described above, in the method for producing the porous carbon sheet 11 of the invention, the unit area weight of the short carbon fibers contained in the precursor fiber sheet is in the range of 15 to 30 $g/m^2$ and the unit area weight of the thermosetting resin is in the range of 30 to 80 $g/m^2$.

It is preferred that the unit area weight of the short carbon fibers 12 is 15 $g/m^2$ or more, since the residual deformation of the porous carbon sheet 11 by compression in the thickness direction is small. It is preferred that the unit area weight of the short carbon fibers 12 is 30 $g/m^2$ or less, since the ratio of the carbonized resin 13 to the short carbon fibers 12 increases to decrease the electrical resistivity of the sheet 11 in the thickness direction.

It is preferred that the unit area weight of the thermosetting resin is 30 $g/m^2$ or more, since the amount of the carbonized resin 13 binding the short carbon fibers 12 increases to decrease the electrical resistivity of the porous carbon sheet 11 in the thickness direction. It is preferred that the unit area weight of the thermosetting resin is 80 $g/m^2$ or less, since the sheet 11 not filled with the carbonized resin 13, to ensure a sufficient void for enhancing gas permeability in the thickness direction.

In the first forming method, it is preferred to dispose the spacers 35 in contact with at least either the upper hot plate 33 or the lower hot plate 34, for establishing the clearance. In the case where the spacers 35 are used, even if the upper hot plate 33 and the lower hot plate 34 are inclined, the spacers 35 can be adjusted to easily establish the clearance at a high accuracy.

In the first forming method, it is preferred that the precursor fiber sheet 31 is carried intermittently between the upper hot plate 33 and the lower hot plate 34, and that while the carrying is suspended, the upper hot plate 33 and the lower hot plate 34 are used to treat the precursor fiber sheet 31 with heating and pressurization. In FIG. 4, the direction in which the precursor fiber sheet 31 is carried is indicated by the arrow 30. If the precursor fiber sheet 31 is carried intermittently and is treated with heating and pressurization while the running of the precursor fiber sheet 31 is suspended, the precursor fiber sheet 31 can be treated with heating and pressurization as a long sheet, without being cut into short sheets having a certain length and a certain width.

In the forming step 23, it is necessary that the precursor fiber sheet is heated in the state where it is pressurized to cure the thermosetting resin and that the cured thermosetting resin binds the dispersed short carbon fibers. Therefore, if the thermosetting resin is heated in the state where the precursor fiber sheet is not pressurized, the short carbon fibers and the thermosetting resin are not sufficiently bound to each other, to raise such a problem that the thickness of the precursor fiber sheet after completion of the forming step becomes less accurate.

Figure 6:
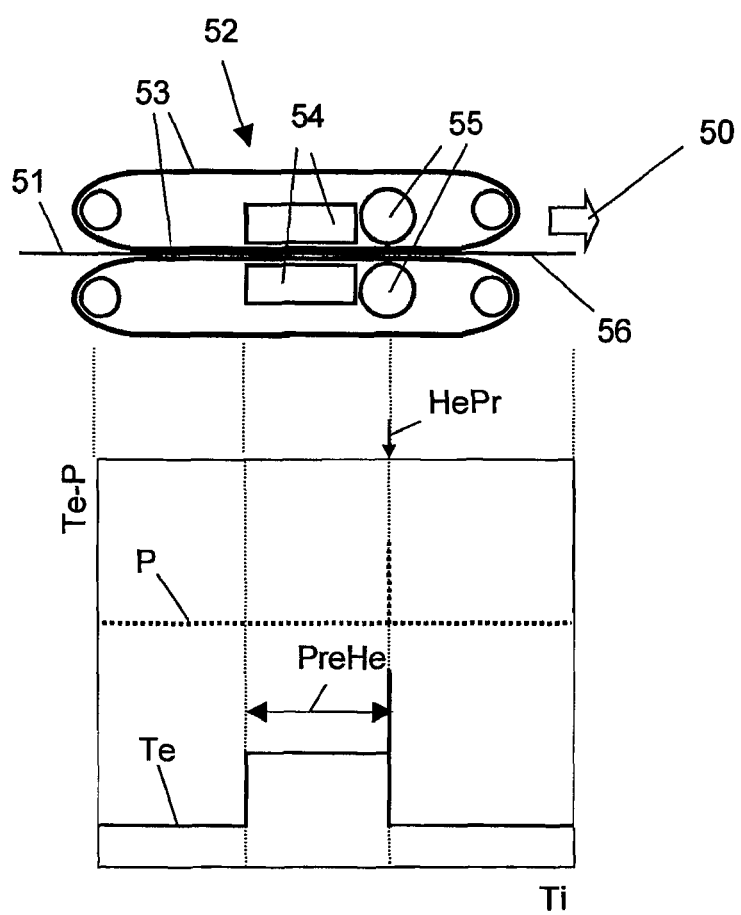
FIG. 6 is a schematic longitudinal sectional view showing a mode of the forming step in the conventional porous carbon sheet production process, including a schematic graph showing a history of the temperature and pressure acting on a precursor fiber sheet in relation with the treatment in the forming step.
Figure 7:
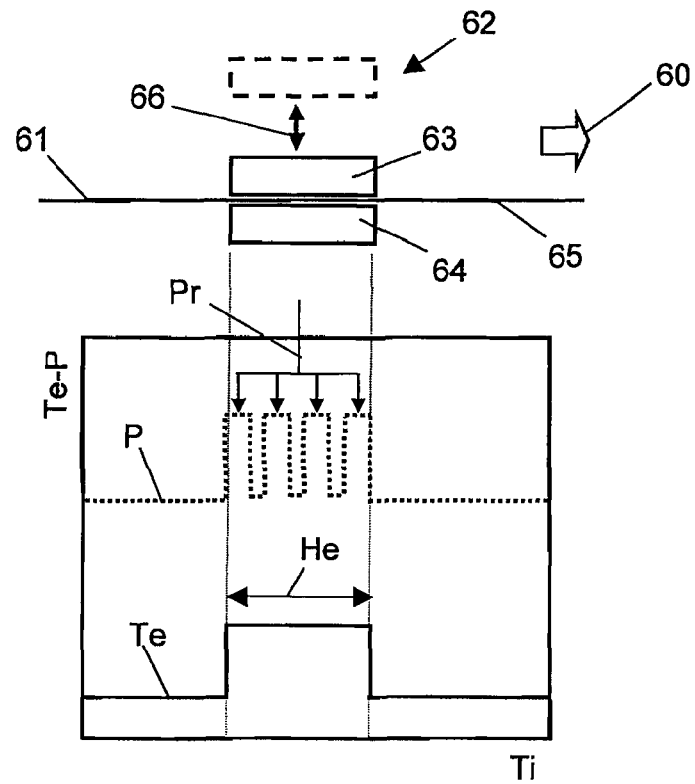
FIG. 7 is a schematic longitudinal sectional view showing a mode of the forming step (the first forming method) in a porous carbon sheet production process of the invention, including a schematic graph showing a history of the temperature and pressure acting on a precursor fiber sheet in relation with the treatment in the forming step.

FIG. 6 is a schematic sectional view showing a mode of the forming step in the conventional porous carbon sheet production process, including a schematic graph showing a history of the temperature and pressure acting on a precursor fiber sheet in relation with the treatment of the forming step. FIG. 7 is a schematic sectional view showing the first forming method, including a schematic graph showing a history of the temperature and pressure acting on a precursor fiber sheet in relation with the treatment of the forming step.

FIG. 6 is a schematic longitudinal sectional view showing the forming step disclosed in WO 01/56103 A. In FIG. 6, for continuous forming, a double belt press apparatus 52 is used, and while a pair of endless belts 53 carries a sheet 51 containing short carbon fibers and a thermosetting resin, the sheet 51 is preheated in a preheating zone 54 and heated and pressurized by a roll press 55, to obtain a formed sheet 56 of the precursor fiber sheet 51. The direction in which the precursor fiber sheet 51 and the formed sheet 56 are carried (running) is indicated by the arrow 50.

The graph below the double belt press apparatus 52 of FIG. 6 shows a history of the temperature and pressure acting on the Sheet 51 in the apparatus 52. The axis of abscissas Ti of the graph shows moving time of the sheet 51 from the inlet to the outlet of the apparatus 52, and the axis of ordinates Te–P shows temperature and pressure acting on the sheet 51 in relation with the movement of the sheet 51. In the graph, change of the temperature is shown by the solid line Te, and change of pressure is shown by the dotted line, P. In the section indicated by the arrow PreHe, the sheet 51 is preheated. At the position of the arrow HePr, the sheet 51 is heated and pressurized.

However, in the double belt press apparatus 52, heating is applied from the preheating zone 54 to the roll press 55, but pressurization is applied by the roll press 55 only for a short time at a line pressure. Therefore, the forming by the double belt press apparatus 52 has a problem that only a formed sheet poor in thickness accuracy can be obtained compared with a batch type flat plate press used in the conventional method for producing a porous carbon sheet having limited length and width as a cut paper:

On the other hand, FIG. 7 shows an intermittent press apparatus 62 for performing the first forming method in the porous carbon sheet 11 production method of the invention. The intermittent press apparatus 62 has a flat plate press comprising an upper face plate 63 and a lower face plate 64. In the flat plate press, the upper face plate 63 moves vertically relatively to the lower face plate 64 as indicated by the arrow 66. The vertical movement repeats opening and closing of the flat plate press. While the flat plate press opens, a precursor fiber sheet 61 and a formed sheet 65 are carried in the direction indicated by the arrow 60. After the carrying of the sheet 61 is suspended, the flat plate press closes, and the sheet 61 is heated and pressurized. After completion of heating and pressurization, the flat plate press opens, and carrying of the sheet 61 is resumed, and the formed sheet 65 is delivered from the intermittent press apparatus 62.

The graph below the intermittent press apparatus 65 of FIG. 7 shows a history of the temperature and pressure acting on the precursor fiber sheet 61 in the apparatus 62. The axis of abscissas Ti of the graph shows moving time of the sheet 61 from the inlet to the outlet of the apparatus 62, and the axis of ordinates Te–P shows temperature and pressure acting on the sheet 61 in relation with the movement of the sheet 61. In the graph, change of the temperature is shown by the solid line Te, and change of the pressure is shown by the dotted line P. In the section indicated by the arrow He, the sheet 61 is heated. At the position of the arrow Pr, the sheet 61 is heated and pressurized. This graph shows a state where intermittent pressing is performed four times.

In the intermittent press apparatus 62, heating is performed in the section from the inlet to the outlet of the press, and pressurization is performed under a load of a pressure in other than the period during which the flat plate press opens for carrying the formed sheet 65. Therefore, in the forming by the intermittent press, compared with the double belt press of FIG. 6, since heating under pressurization can be continued for a sufficiently long period of time, the formed sheet 65 obtained has a more highly accurate thickness.

However, even in the forming by use of the intermittent press apparatus, since the resin is progressively cured without being pressurized while the flat plate press opens for carrying the formed sheet, the formed sheet has a thickness as accurate as merely achieved by using the conventional batch type flat plate press apparatus.

Figure 8:
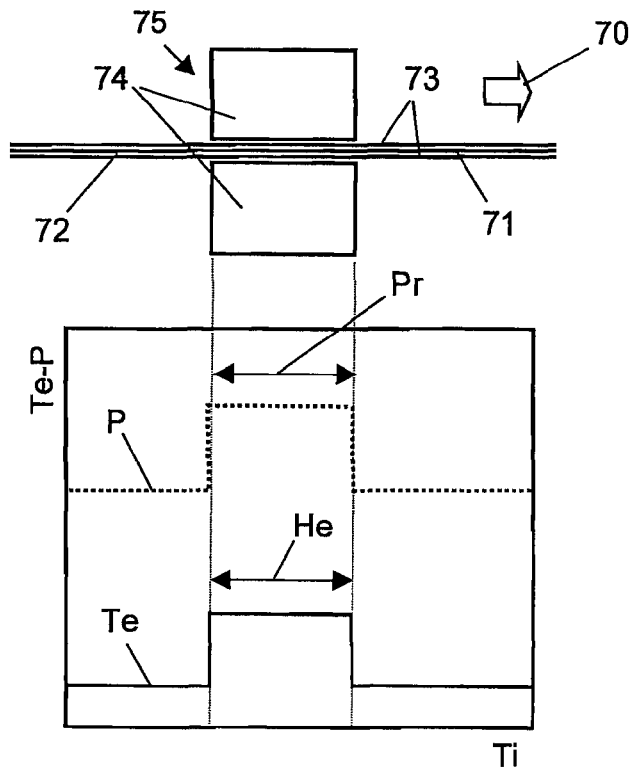
FIG. 8 is a schematic longitudinal sectional view showing another mode of the forming step (the second forming method) in a porous carbon sheet production process of the invention, including a schematic graph showing a history of the temperature and pressure acting on a precursor fiber sheet in relation with the treatment in the forming step.

FIG. 8 shows a die belt forming apparatus 75 for performing the second forming method in the porous carbon sheet production method of the invention. The die belt forming apparatus 75 has a pair of running belts 73 and a heated die 74. The pair of belts 73 continuously moves in the direction indicated by the arrow 70. During the movement, the pair of belts 73 passes through the die 74. A precursor fiber sheet 72 is held between the pair of belts 73 and continuously moves in the direction indicated by the arrow 70 together with the pair of belts 73. During the movement, the precursor fiber sheet 72 passes through the die 74 together with the pair of belts 73. While the precursor fiber sheet 72 held between the pair of belts 73 passes through the die 74, the precursor fiber sheet 72 is treated with heating and forming. The heating and forming treatment causes a thermosetting resin of the precursor fiber sheet 72 to be cured and causes short carbon fibers and the thermosetting resin to be bound to each other. The precursor fiber sheet 72 held between the pair of belts 73 passing through the die 74 has the thermosetting resin cured, resulting in a precursor fiber sheet 71 formed to have a desired thickness.

The graph below the die belt forming apparatus 75 of FIG. 8 shows a history of the temperature and pressure acting on the sheet 72 in the apparatus 75. The axis of abscissas Ti of the graph shows moving time of the sheet 72 from the inlet to the outlet of the apparatus 75, and the axis of ordinates Te–P shows temperature and pressure acting on the sheet 72 in relation with the movement of the sheet 72. In the graph, change of the temperature is indicated by the solid line Te, and change of the pressure is indicated by the dotted line P. In the section indicated by the arrow He, the sheet 72 is heated. In the section indicated by the arrow Pr, the sheet 72 is formed. That is, in both the sections, the sheet 72 is heated and formed. Therefore, in the forming by the die belt forming apparatus 75, since the sheet is heated while it is always kept at a certain thickness, the formed sheet 71 obtained has a more highly accurate thickness.

Figure 5:
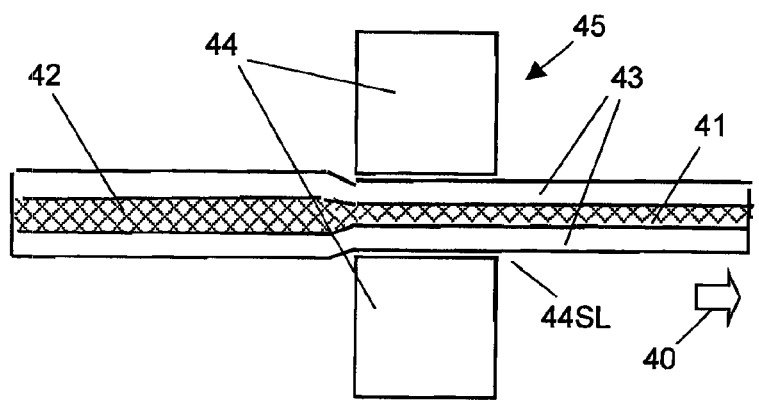
FIG. 5 is a schematic longitudinal sectional view showing a forming apparatus used in another mode of the forming step (a second forming method) for carrying out a porous carbon sheet production method of the invention.

FIG. 5 is an expanded schematic longitudinal sectional view showing the die 74 of the die belt forming apparatus 75 shown in FIG. 8 and its vicinity, used for carrying out the second forming method as another mode of the forming step 23 in the porous carbon sheet production process of the invention explained above.

In FIG. 5, a die belt forming apparatus 45 comprises a pair of belts 43 and a die 44 having a slit 44SL through which the pair of belts 43 runs and passes. The die 44 has a heater (not shown in the drawing) for heating the die. A precursor fiber sheet 42 is held between the pair of running belts 43, and is continuously guided into the slit 44SL of the die 44 together with the belts 43, to be heated and formed. The heated and formed precursor fiber sheet 42 has the thermosetting resin cured to become a precursor fiber sheet 41 formed to have a desired thickness. The precursor fiber sheet 41 is delivered from the die 44 together with the pair of belts 43 and moves in the direction indicated by the arrow 40.

In FIG. 5, to prevent that the precursor fiber sheet 42 sticks to the die because of the cured thermosetting resin, it is only required that the width of the pair of belts 43 is larger than the width of the sheet 42. That is, it is only required that the entire surfaces of the sheet 42 are always covered with the pair of belts 43, when they pass through the die 44.

It is preferred that the length of the die 44 in the running direction of the precursor fiber sheet 42 is in the range of 5 is to 100 cm. A more preferred range is 10 to 80 cm, and a further more preferred range is 30 to 60 cm. If the length of the die 44 is smaller than 5 cm, the time during which the sheet 42 containing the short carbon fibers and the thermosetting resin is heated by the die 44 becomes short, and the thermosetting resin may not be cured sufficiently. Further, if the length of the die 44 is larger than 100 cm, the tension required for driving the pair of belts 43 may become too large. It is preferred that the width of the slit 44SL formed in the die 44 is larger than the width of the precursor fiber sheet 42 to be formed.

It is preferred that a heating temperature of the die 44 is in the range of 120 to 300° C. A more preferred range is 160 to 280° C. and a further more preferred range is 180 to 260° C. If the heating temperature is lower than 120° C., the reaction rate of the thermosetting resin may decline. Further, if the heating temperature is higher than 300° C., the fluorine resin contained in the releasable and lubricant layers described later may be molten or thermally decomposed. As the heater of the die 44, a heater as used for an ordinary flat plate press or roll press can be used.

It is preferred that a fiber length of the short carbon fibers is in the range of 3 to 20 mm. A more preferred range is 5 to 15 mm. In the case where the fiber length of the short carbon fibers is kept in this range, when the short carbon fiber sheet is obtained by picking up the dispersed short carbon fibers on a wire cloth in the paper making step 21, the dispersibility of the short carbon fibers can be enhanced to inhibit the fluctuation of unit area weight.

Usable examples of the thermosetting resin include a phenol resin, melamine resin, urea resin, epoxy resin, etc. It is preferred to use a phenol resin, since it is high in the carbonization yield when it is heated in an inert atmosphere.

In the method of controlling the thickness of the precursor fiber sheet by a pressure of a batch press, double belt press or the like, fluctuations of the unit area weights of the short carbon fibers and the thermosetting resin directly result in the fluctuation of the thickness of the precursor fiber sheet.

On the other hand, in the porous carbon sheet production method of the invention, the thickness of the precursor fiber sheet is controlled by a clearance, not by a pressure. Therefore, even if a material fluctuating in unit area weight is used, high pressures act on the portions having high unit area weights and low pressures act on the portions having low unit area weights, allowing a precursor fiber sheet having a highly accurate thickness to be obtained.

It is preferred that the clearance of the slit 44SL formed in the die 44 is the sum of the product obtained by multiplying so a thickness of the pair of belts 43 by a factor of 0.5 to 1.5 and the product obtained by multiplying a thickness of the formed precursor fiber sheet 42 by a factor of 0.5 to 1.5. The factor used for multiplying the thickness of the sheet 42 is required to be adjusted based on the short carbon fibers and the thermosetting resin used and their amounts, and if the factor is adjusted suitably in the range of 0.5 to 1.5, the precursor fiber sheet 41 obtained can have a desired thickness.

As shown in FIG. 5, in the second forming method, the precursor fiber sheet is heated always with a certain clearance kept, to cure the thermosetting resin for binding the short carbon fibers. Therefore, compared with the conventional method of producing a long sheet using a double belt press or the first forming method, in which the precursor fiber sheet is heated without being pressurized for a certain period of time, a long precursor fiber sheet having a more highly accurate thickness can be obtained.

Further, a method of forming a precursor fiber sheet having limited length and width as a cut paper using a batch press requires that the size of the press face plates is larger than the size of the precursor fiber sheet to be formed. So, obtaining a formed precursor fiber sheet having relatively long size, the press apparatus must have a large scale. Further, if the precursor fiber sheet to be formed are large, the press face plates must have a large size, and it is difficult to maintain parallelism of the press face plates. So, the formed precursor fiber sheet becomes poor in accuracy of thickness.

On the other hand, according to the second forming method, the width of the die 44 must be larger than the width of the precursor fiber sheet 42 to be formed, lest the precursor fiber sheet 42 should directly contact the die 44, but the length of the die 44 in the running direction of the precursor fiber sheet 42 can be shorter than the precursor fiber sheet 42, since the precursor fiber sheet 42 is continuously heated and formed while it is guided into the die. Therefore, it is easy to maintain parallelism of the slit 44SL formed in the die 44, and a long precursor fiber sheet having a more highly accurate thickness than that obtained by the batch press can be obtained.

Figure 9:
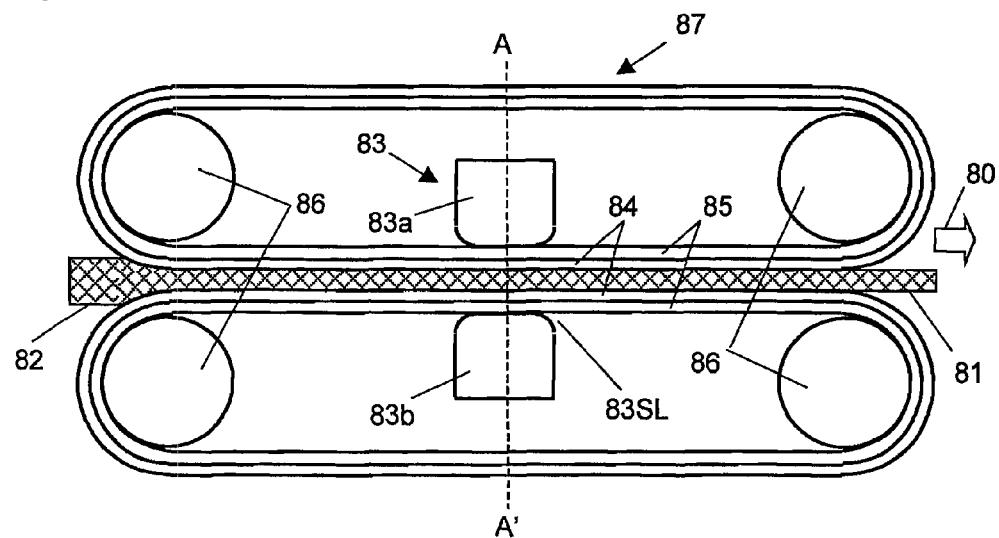
FIG. 9 is a schematic longitudinal sectional view showing a forming apparatus for the other mode of the forming step (the second forming method) in a porous carbon sheet production process of the invention.
Figure 10:
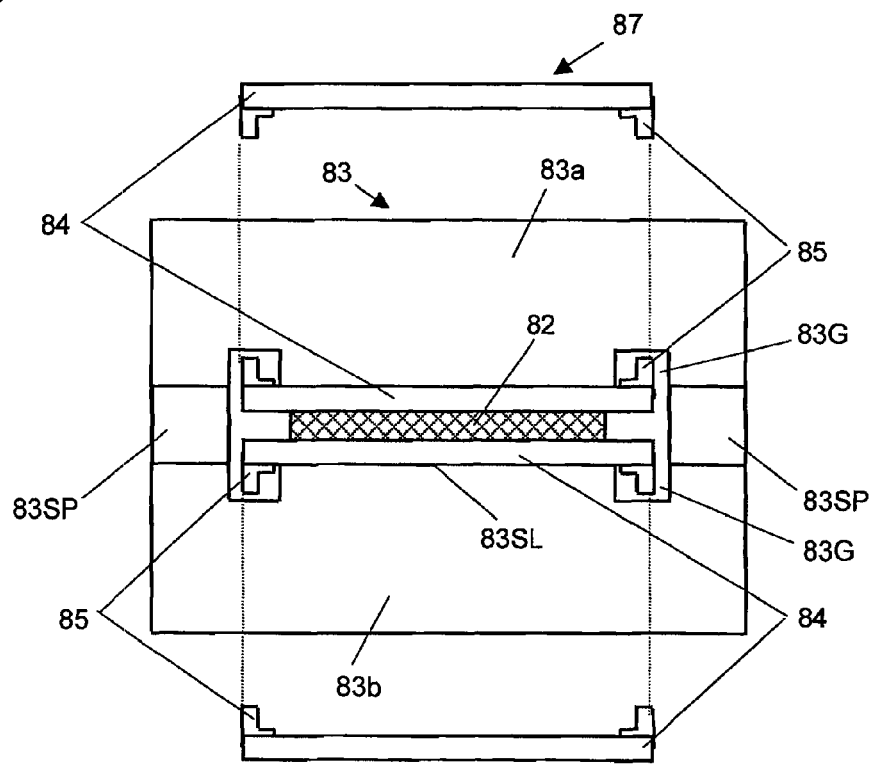
FIG. 10 is a partial sectional view taken along the plane A-A' in FIG. 9.

FIG. 9 is a schematic longitudinal sectional view showing a die belt forming apparatus using a pair of endless belts which are used instead of the pair of belts 43 in the die belt forming apparatus 45 shown in FIG. 5. FIG. 10 is a cross sectional view taken along the plane A-A' in FIG. 9. In FIGS. 9 and 10, a die belt forming apparatus 87 has a pair of endless belts 84, drive means 86 for driving the belts 84, and a die 83 having a slit 83SL through which the belts 84 pass. The die 83 has a heater (not shown in the drawing) for heating it. A heated and formed precursor fiber sheet 82 has a thermosetting resin cured and becomes a formed precursor fiber sheet 81 that moves in the direction indicated by the arrow 80 together with the pair of endless belts 84.

In FIGS. 9 and 10, the die 83 comprises a pair of metal blocks 83a and 83b. The slit 83SL of the die 83 is formed by spacers 83SP installed between the pair of metal blocks 83a and 83b. The height of the spacers 83SP can be selected to adjust the clearance of the die 83. If the spacers are used, it is not necessary to prearrange different dies 83 suitable for respective thicknesses of the precursor fiber sheet 81 to be formed. Further, since the die 83 can be assembled and disassembled, endless belts can be used as the pair of belts for carrying the precursor fiber sheet.

There is a pultrusion method in which reinforcing fibers containing a thermosetting resin are pulled through a heated die like the second forming method. In the pultrusion method, the formed sheet obtained is pulled with tension. Therefore, to prevent that the formed sheet is broken by tension, it is necessary that the formed sheet has reinforcing fibers oriented in the longitudinal direction.

On the other hand, in the second forming method, the precursor fiber sheet containing the short carbon fibers and the thermosetting resin is held between a pair of belts when it is guided into a die having a slit, for being heated and formed. Therefore, since the tension necessary for guiding the sheet into the die acts on the belts, a precursor fiber sheet not having the reinforcing fibers oriented in the longitudinal direction, hence weak against pulling in the longitudinal can also be heated and formed by the second forming method, though it is difficult to form such a precursor fiber sheet by the protrusion method.

It is preferred that the pair of belts 43 has releasable layers formed on the surfaces brought into contact with the precursor fiber sheet 42. If the releasable layers exist, the sticking of the thermosetting resin cured by heating to the belts 43 can be prevented. It is preferred that the releasable layers are fluorine resin-containing layers.

It is preferred that the pair of belts 43 is belts having lubricant layers on the surfaces brought into contact with the die 44. A large tension is necessary to guide the precursor fiber sheet 42 into the slit formed in the die 44. If the lubricant layers are formed, the friction with the die 44 can be decreased to reduce the necessary tension.

To decrease the friction between the pair of belts 43 and the die 44, lubricant layers may also be formed on the surfaces in contact with the pair of belts 43, of the slit of the die 44.

It is preferred that the lubricant layers formed on the die 44 contain a filler. The lubricant layers containing the filler can be enhanced in wear resistance. If the lubricant layers are worn by friction, the clearance of the slit 44SL of the die 44 changes, and a precursor fiber sheet having a desired thickness may not be obtained.

It is preferred that the lubricant layers are fluorine resin-containing layers. Particularly the surfaces of the die 44 brought into sliding contact with the belts are coated with a fluorine resin by baking.

The fluorine resin refers to a resin containing fluorine atoms in the molecule such as tetrafluoroethylene resin (PTFE), perfluoroalkoxy resin (PFA), fluorinated ethylene propylene resin (FEP) or fluorinated ethylene tetrafluoroethylene resin (ETFE).

The filler contained in the lubricant layers can be carbon fibers, glass fibers, graphite particles, bronze or molybdenum disulfide, etc.

Figure 11:
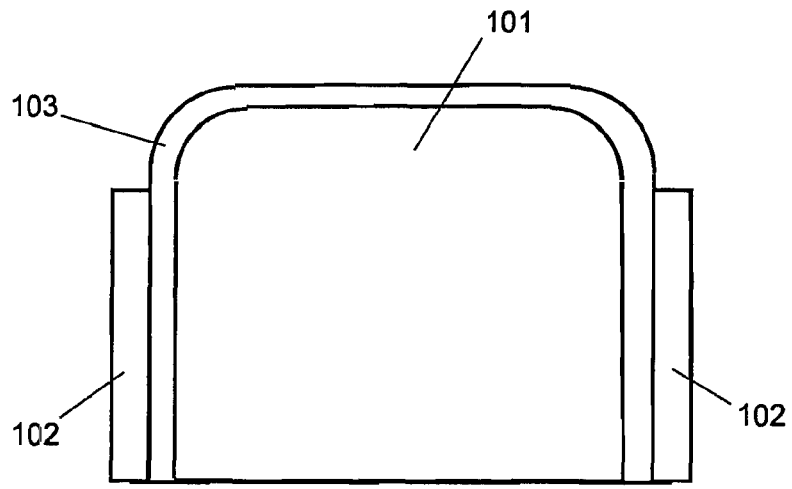
FIG. 11 is a schematic sectional view showing a mode of the metal block used in a forming apparatus for the other mode of the forming step (the second forming method) in a porous carbon sheet production process of the invention.

FIG. 11 is a side view showing a modified example of one of the pair of metal blocks 83a and 83b of the die 83 shown in FIG. 9. In FIG. 11, a metal block 101 has a filler-containing fluorine resin sheet 103 stuck to its lateral face, and the sheet 103 is fastened by fastening plates 102. The exchangeable filler-containing fluorine resin sheet 103 is more excellent in maintainability than the fluorine resin coating formed by baking.

The pair of belts 43 can respectively comprise a woven glass fiber fabric and a fluorine resin-containing sheet. Further, a metallic sheet covered on both surfaces with a fluorine resin can also be used.

It is preferred that the pair of belts 43 is the pair of endless belts 84 as shown in FIGS. 9 and 10. If endless belts are used, a precursor fiber sheet 81 having an arbitrary length can be formed.

It is preferred that the pair of endless belts 84 is provided with tension transmitting portions 85 at both the edges of the surfaces in contact with the die 83 over the entire circumference. Depending on the width and the thickness of the formed sheet 81, a large tension may be necessary for the pair of endless belts 84. Several methods can be considered to transmit power to the endless belts.

In the case where the endless belts are nipped by drive rolls for transmitting power, line pressures act on the endless belts; causing locally concentrated loads to act. So, the durability of the endless belts comes into problem. Further in the case where lubricant layers are formed on the endless belts, slipping occurs between the endless belts and the drive rolls, not allowing sufficient power to be transmitted.

In the case where the endless belts are driven by friction rolls for transmitting power, the lubricant layers formed on the endless belts are worn by the friction rolls. Further, in the case where the endless belts are drilled and have pins installed for transmitting power using corresponding pulleys, local loads act on the pulley portions of the endless belts. So, the durability of the endless belts comes into problem.

If the pair of endless belts 84 is provided with the tension transmitting portions 85 at both the edges on the surfaces in contact with the die 83 over the entire circumference, the tension can be dispersed over the entire circumference of the belts, and the necessary power can be transmitted without allowing large loads to act on the local portions of the endless belts 84.

In the case where the pair of endless belts 84 is provided with the tension transmitting portions 85, it is preferred to form grooves 83G for allowing the power transmitting portions 85 to pass through them, in the metal blocks 83a and 83b as shown in FIG. 10.

It is preferred that the tension transmitting portions 85 have a high tensile strength and can be fastened over the entire circumference of the endless belts 84 like roller chains with attachments. Power can be transmitted to the pair of endless belts from the drive means 86 through the power transmitting portions 85. As the drive means 86, those corresponding to the tension transmitting portions 85 are used, and in the case of the roller chains, corresponding sprockets are used.

According to the second forming method, a porous carbon sheet in which the standard deviation of the thickness in the longitudinal direction is in the range of 1.0 to 5.0 μm can be obtained. If the standard deviation is in the range of 1.0 to 5.0 μm, a porous carbon sheet having a highly accurate thickness can be obtained as described later.

A long sheet means a precursor fiber sheet having a length difficult to obtain by a batch press. Particularly a long sheet means a sheet having a length of 10 m or more. Further, considering that a porous carbon sheet is obtained by a continuous heat-treating and that a higher processability of the obtained porous carbon fiber sheet is required in a downstream process, it is preferred that the length of the precursor fiber sheet is 100 m or more. Furthermore, it is preferred that the length of the porous carbon sheet is 1,000 m or less, since otherwise a winding diameter becomes so large as to make handling difficult.

It is preferred that a width of the porous carbon sheet is in the range of 10 to 200 cm. If the width of the porous carbon sheet is smaller than 10 cm, it is difficult to obtain a gas diffusion layer having a size necessary for a solid polymer fuel cell described later. Further, to obtain a porous carbon sheet having a width of larger than 200 cm, a continuous heat-treating furnace having a large width is necessary as large-scale equipment for the heat-treating described later.

It is preferred that a standard deviation of the thickness of the porous carbon sheet of the invention in the longitudinal direction is in the range of 1.0 to 4.5 μm.

A thickness of the porous carbon sheet greatly depends on the thickness of the precursor fiber sheet before heat-treating. If a precursor fiber sheet of 1.0 to 5.0 μm in the standard deviation of the thickness in the longitudinal direction is continuously heat-treated, a porous carbon sheet of 1.0 to 4.5 μm in the standard deviation of the thickness in the longitudinal direction can be obtained.

The porous carbon sheet of the invention can be preferably used as gas diffusion layers of solid polymer fuel cells. In general, in a solid polymer fuel cell, a gasket is used for sealing the supplied gas. However, if a gas diffusion layer greatly fluctuates in thickness, the sealing at a thick portion becomes insufficient to cause gas leak. Further, at a thin portion, the electric contact between a flow field plate and the gas diffusion layer cannot be sufficiently secured to increase ohm loss, for raising the problem that cell performance declines. The porous carbon sheet of the invention does not raise such a problem, since it is 4.5 μm or less in the standard deviation of the thickness in the longitudinal direction.

According to the second forming method, a precursor fiber sheet heated using hot plates having a certain clearance provided between them to cure the thermosetting resin for binding the short carbon fibers, is heat-treated to obtain a porous carbon sheet. Therefore, the porous carbon sheet 11 of the invention obtained by the second forming method is small in the deformation by compression in the thickness direction and is also small in the resistivity in the thickness direction, since the carbonized resin sufficiently binds the short carbon fibers.

It is preferred that the porous carbon sheet 11 of the invention has a thickness in the range of 100 to 250 μm. A long porous carbon sheet can be handled as a roll, but if the thickness is smaller than 100 μm, the sheet is so thin as being likely to be cracked. If the thickness is larger than 250 μm, the sheet is so thick as to raise the problem that it is difficult to wind the sheet as a roll. The thickness of the porous carbon sheet 11 can be controlled by adjusting unit area weights of the short carbon fibers and the thermosetting resin respectively used for production and a clearance between the hot plates used in the forming step 23, etc.

In the forming step 23, it is preferred that the ratio of the weight of the thermosetting resin to the weight of the short carbon fibers is in the range of 1 to 3. If the ratio of the weight of the thermosetting resin to the weight of the short carbon fibers is less than 1 the number of biding points at which the carbonized resin of the porous carbon sheet binds the short carbon fibers decreases, and the electrical resistivity of the sheet in the thickness direction and the residual deformation by compression in the thickness direction increase respectively. If the ratio of the weight of the thermosetting resin to the weight of the short carbon fibers is larger than 3, the void of the porous carbon sheet is filled with the carbonized resin, and the gas permeation resistance of the sheet in the thickness direction increases.

It is preferred to set the clearance to ensure that in the precursor fiber sheet obtained by the heating and forming treatment in the forming step 23, the density of the short carbon fibers contained in the precursor fiber sheet becomes in the range of 0.05 to 0.27 g/cm$^3$ while the density of the thermosetting resin contained in the precursor fiber sheet becomes in the range of 0.15 to 0.40 g/cm$^3$. It is preferred that an actual example of the clearance is in the range of 100 to 500

μm per one precursor fiber sheet. A more preferred range is 150 to 400 μm, and a further more preferred range is 200 to 350 μm.

The average fiber diameter of the short carbon fibers little changes even in the carbonizing step 24. To keep the average fiber diameter of the short carbon fibers constituting the porous carbon sheet in the range of 5 to 20 μm, it is preferred that the average fiber diameter of the short carbon fibers used in the paper making step 21 is in the range of 5 to 20 μm.

It is preferred that the precursor fiber sheet contains a carbonaceous powder. Particularly, as described before, method of adding a carbonaceous powder into a thermosetting resin solution in the resin impregnation step 22 can be employed. If the precursor fiber sheet contains a carbonaceous powder, the conductivity of the porous carbon sheet per se can be enhanced, and in the case where especially a continuous heat-treating furnace is used in the carbonizing step 24 described later, the cracking of the carbonized resin can be decreased to inhibit the conductivity of the sheet declines.

in the carbonizing step 24, a batch type heating furnace can also be used. However, in view of productivity, preferred is a continuous production process, in which while the precursor fiber sheet is continuously run in a heating furnace internally kept in an inert atmosphere, the temperature is raised at least up to 1,200° C. at a heating rate in the range of 100 to 10,000° C./min, to heat-treat the precursor fiber sheet, for carbonizing the thermosetting resin, and subsequently the obtained porous carbon sheet is wound as a roll.

It is preferred that the heating rate in the carbonizing step 24 is in the range of 300 to 7,000° C./min. A more preferred range is 500 to 5,000° C./min. If the heating rate is too slow, the productivity of the porous carbon sheet declines. If the heating rate is too high, the sudden carbonization contraction of the thermosetting resin causes the carbonized resin to be cracked, and increases the separation at the binding interfaces between the short carbon fibers and the carbonized resin, for increasing the electrical resistivity of the porous carbon sheet in the thickness direction.

It is preferred that the heating temperature in the carbonizing step 24 is 1,500° C. or higher. More preferred is 1,800° C. or higher. If the heating temperature is too low, more impurities remain in the porous carbon sheet, and if such a porous carbon sheet is used as a gas diffusion layer of a fuel cell, proton conduction of a solid polymer electrolyte membranes is prevented to lower cell performance. In view of durability and energy consumption of the heating furnace, it is preferred that the heating temperature is 2,500° C. or lower. More preferred is 2,200° C. or lower, and furthermore preferred is 2,000° C. or lower.

In the carbonizing step 24, it is preferred to install a bending member for bending the precursor fiber sheet in the longitudinal direction while the precursor fiber sheet is run in the heating furnace, so that the precursor fiber sheet can be brought into contact with the bending member while it is run.

If the precursor fiber sheet is bent by the bending member in the longitudinal direction, the precursor fiber sheet is made unlikely to be bent in the transverse direction. So, the porous carbon sheet is unlikely to be wrinkled by carbonization contraction of the thermosetting resin, etc. in the carbonizing step. Further, if the sheet is brought into contact with the bending member, the sheet can be elongated in the carbonizing step, and wrinkling and unevenness are unlikely to occur.

Further, if the tension of the precursor fiber sheet in the running direction rises in the carbonizing step, the sheet is likely to be wrinkled in the transverse direction of the sheet, and if the tension of the sheet in the running direction declines, unevenness in random directions is likely to occur in the sheet. However, in the case where the bending member is used, even if the tension of the precursor fiber sheet in the running direction is high, the wrinkling of the sheet in the transverse direction can be inhibited, and a high tension can be applied to the precursor fiber sheet. Therefore, the unevenness caused by a low tension can also be prevented.

It is preferred that the heating furnace allows an internal temperature in the range of 400 to 2,700° C. to be set. Further, it is preferred that the heating furnace has a temperature region in the range of 400 to 800° C. and a temperature region in the range of 1,600 to 2, 700° C. These two temperature regions (a temperature region in the range of 400 to 800° C. and a temperature region in the range of 1,600 to 2,700° C.) can be established in one heating furnace, or plural heating furnaces for establishing the respective temperature regions independently can also be installed for performing the heat-treating in two stages. In the case where heat-treating is performed in two stages, both the sheet heat-treated in the first stage and the sheet heat-treated in the second stage are called the precursor fiber sheet.

In the heating furnace(s), the precursor fiber sheet is continuously run in a space set at a predetermined temperature, to be heat-treated, for finally producing a porous carbon sheet. As a method for running the sheet (the precursor fiber sheet or the porous carbon sheet), the precursor fiber sheet carried from outside the furnace is introduced into the furnace from the opening at the inlet of the furnace, and the sheet (the precursor fiber sheet or the porous carbon sheet) heat-treated in the space at the predetermined temperature is delivered from the opening at the outlet of the furnace and wound outside the furnace. This method is preferred for producing a long porous carbon sheet, since the precursor fiber sheet or porous carbon sheet can be easily carried and run. It is preferred that the furnace is internally kept in an inert atmosphere for preventing the oxidation of the precursor fiber sheet (for preventing the run-away reaction).

In the case where one heating furnace is divided into a temperature region of 400 to 800° C. and a temperature region of 1,600 to 2,700° C. or where a heating furnace having a temperature of 400 to 800° C. and a heating furnace having a temperature of 1,600 to 2,700° C. are installed for heat-treating in two stages, it is preferred that the highest temperatures of the respective temperature regions (or respective heating furnaces) are in the range of about 600 to about 800° C. and in the range of about 1,600 to about 2, 700° C. respectively. If heat-treating is performed in two stages like this, tension conditions can be changed between the heat treatment at 600 to 800° C. where much decomposition gas is generated while the contraction by carbonization takes place and the heat treatment at 1,600 to 2,700° C. where the treated sheet is likely to be wrinkled and uneven.

If the precursor fiber sheet contacts a bending member installed in the heating furnace, it is bent in the longitudinal direction at a temperature in the range of 400 to 2,500° C. The bending member is installed on the furnace floor, the furnace ceiling or between the furnace floor and the furnace ceiling, and it is preferred that the overall width of the sheet is brought into contact with the bending member. The material of the bending member can be carbon, metal or ceramic, but in view of low cost, carbon or metal is preferred. In the case where the bending member is used at a temperature higher than 1,000° C., carbon is especially preferred in view of chemical stability.

Figure 12:
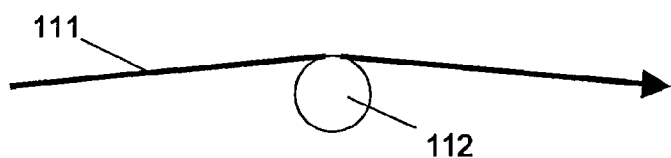
FIG. 12 is a side view showing an example of the sheet bending state by a bending member used in a mode of the carbonizing step in a porous carbon sheet production process of the invention.
Figure 13:
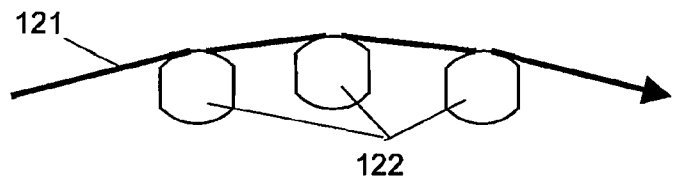
FIG. 13 is a side view showing another example of the sheet bending state by bending members used in a mode of the carbonizing step in a porous carbon sheet production process of the invention.
Figure 14:
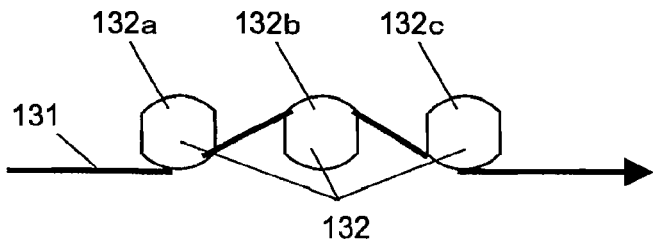
FIG. 14 is a side view showing a further other example of the sheet bending state by bending members used in a mode of the carbonizing step in a porous carbon sheet production process of the invention.

Examples of the bending state where the precursor fiber sheet is bent in the longitudinal direction using a bending member(s) while it is run are shown in FIGS. 12, 13 and 14.

In FIG. 12, a running precursor fiber sheet 111 runs with its bottom surface brought into contact with the top surface of a bending member 112. The shape of the cross section of the bending member 112 is not necessarily required to be circular, but for preventing that the sheet 111 is bent at a sharp angle, for example as shown in FIG. 13, it is preferred that the surfaces of bending members 122 brought into contact with the precursor fiber sheet 121 are entirely or partially gently curved. Among the parts constituting the bending members, the parts kept in contact with the precursor fiber sheet can be rotated or not, but in view of simple member structure, a fixed structure incapable of rotating is preferred.

In the specification, the longitudinal direction refers to the long side direction, namely, the running direction of the precursor fiber sheet. It is preferred that the number of times for bending the precursor fiber sheet is in the range of 1 to 10. A more preferred range is 3 to 8, and an especially preferred range is 5 to 7. In the case where the number of bending times is too large, especially when the precursor fiber sheet is heat-treated, it may be wrinkled in the longitudinal direction. In FIG. 12 where one bending member 112 is used, the number of times for bending the precursor fiber sheet 111 is one. In FIG. 13 where three bending members 122 are used, the number of times for bending the precursor fiber sheet 121 is three. In FIG. 14 where three bending members 132 are used, the number of times for bending the precursor fiber sheet 131 is three. In the case where the precursor fiber sheet is bent plural times, it is preferred that at least one time of bending is performed in the temperature region, since the property values of the porous carbon sheet of the invention can be appropriately improved.

In the heat treatment region of 400 to 800° C., organic materials contained in the precursor fiber sheet are thermally decomposed or carbonized. So, if the precursor fiber sheet is bent in a temperature region of 400 to 800° C., preferably 500 to 700° C., wrinkling can be prevented.

In a heat treatment region of 1,600° C. or higher, it can be observed that the precursor fiber sheet is wrinkled by tension, and the reason is considered to be that the carbon material is likely to be deformed. In a high temperature heat treatment region of higher than 2,700° C., the consumption of the carbon material constituting the furnace increases. Therefore, it is an effective method for preventing the wrinkling and unevenness in the production of the porous carbon sheet of the invention, to bend the precursor fiber sheet in a heat treatment region of 1,600 to 2,700° C., preferably 1,700 to 2,200° C., or more preferably 1,750 to 2,000° C.

However, it is not necessarily required to bend the precursor fiber sheet in the entire heat treatment region of the heating furnace, and if the precursor fiber sheet is bent in a partial heat treatment region, wrinkling and unevenness can be prevented.

Figure 15:
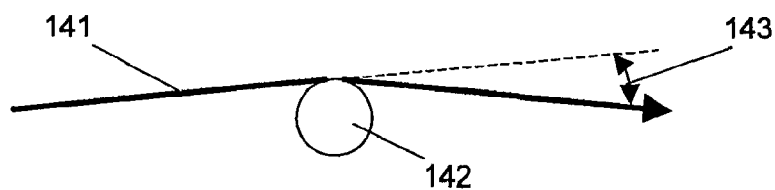
FIG. 15 is a side view for explaining the bending angle of a sheet by a bending member used in a mode of the carbonizing step in a porous carbon sheet production process of the invention.

The bending angle of the precursor fiber sheet means an angle formed between a running direction of a precursor fiber sheet at the position where the running precursor fiber sheet contacts a bending member and the running direction of the precursor fiber sheet at a position where the precursor sheet bent in contact with the bending member is leaving from the bending member. The bending angle of the precursor fiber sheet running straight is expressed by 0°, and the bending angle of the precursor fiber sheet making a U turn is expressed by 180°. The bending angle is expressed as an absolute value in a range from 0 to 180°. In the case where the number of bending times is plural, it is preferred that at least one time of bending is performed in a heat treatment region of the specific temperature range at a bending angle in the specific range. Especially it is preferred that all the bending actions in a heat treatment region of 1,600 to 2,700° C., preferably 1,700 to 2,200° C., more preferably 1,750 to 2,000° C. are performed at not larger than the upper limit bending angle and at not smaller than the lower limit bending angle respectively in the specific range. FIG. 15 is a schematic side view for explaining the bending angle.

In FIG. 15, the angle 143 formed between the dotted line extending in the progress direction of a precursor fiber sheet 141 at the position in contact with a bending member 142 and the progress direction of the precursor fiber sheet 141 at a position leaving from the bending member 142 is the bending angle. It is preferred that the bending angle is in the range of 3 to 180°. A more preferred range is 5 to 25°, and an especially preferred range is 6 to 10°. If the bending angle is too small, the effect of preventing wrinkles by bending cannot be sufficiently obtained. When the bending angle is calculated, the sag of the precursor fiber sheet due to gravity and the like is not taken into account, and the angle is calculated in reference to the disposed bending member. If the bending angle is large, the height of a furnace becomes high, and energy consumption needed for keeping an internal temperature of the furnace increases.

If a large bending angle is employed in the case where the precursor fiber sheet contains a non-fibrous organic material, the precursor fiber sheet tends to be cracked and tends to be wrinkled in the running direction. To prevent them, it is preferred that the bending angle is in the range of 5 to 25°, and a more preferred range is 6 to 10°. Especially in the case where a phenol resin, furan resin, melamine resin or pitch is contained as the non-fibrous organic material, cracking and wrinkling are likely to occur. So, a bending angle in the range of 5 to 25° is preferred, and a more preferred range is 6 to 10°. Further, in the case where the precursor fiber sheet is produced by a paper making method, the fibers are less entangled with each other and the sheet is likely to be cracked. So, a bending angle in the range of 5 to 25° is preferred, and an especially preferred range is 6 to 10°.

Similarly, in the case where the precursor fiber sheet contains short carbon fibers and an organic material capable of being carbonized for binding the short carbon fibers, or in the case where the precursor fiber sheet contains short carbon fibers and a carbonized organic material for binding the short carbon fibers, a large bending angle tends to crack the precursor fiber sheet and tends to wrinkle it in the running direction. To prevent them, it is preferred that the bending angle is in the range of 5 to 25°, and a more preferred range is 6 to 10°. The organic material capable of being carbonized is such an organic material that if it is heat-treated at the highest temperature of 1,000° C. in an inert atmosphere such as nitrogen, the weight loss is less than about 90 wt %. Examples of the organic material include a phenol resin, furan resin, melamine resin and pitch. Especially in the case where the precursor fiber sheet is produced by a paper making method, the fibers are less entangled with each other and the sheet is likely to be cracked. So, a bending angle n the range of 5 to 25° is preferred, and a more preferred range is 6 to 10°.

In the porous carbon sheet production method of the invention, if the precursor fiber sheet is brought into contact with the top surface of a first bending member and subsequently brought into contact with the bottom surface of the next bending member, for bending the precursor fiber sheet on the rear and front surfaces in succession, the contact pressure between the precursor fiber sheet and the bending members can be enhanced or the number of bending times can be increased for preventing wrinkles.

FIG. 14 is a schematic side view showing an example of the constitution. In FIG. 14, the front surface of a running precursor fiber sheet 131 contacts the bottom surface of a first bending member 132a among three bending members 132, to be bent, and then the rear surface of the precursor fiber sheet 131 contacts the top surface of a second bending member 132b, to be bent, further the front surface of the precursor fiber sheet 131 contacts the bottom surface of a third bending member 132c, to be bent again. The bending members kept in contact with the front and rear surfaces of the precursor fiber sheet are installed in the furnace considering the positions of the furnace floor and the furnace ceiling.

In the porous carbon sheet production method of the invention, it is preferred that the tension acting on the precursor fiber sheet or the porous carbon sheet at the outlet portion of a heating furnace is in the range of 3 to 100 N/m. A more preferred range is 5 to 50 N/m, and an especially preferred range is 10 to 25 N/m. If the tension is too low, the effect of preventing wrinkles and unevenness cannot be sufficiently obtained. If the tension is too high, the sheet tends to be broken and tend to contract in the transverse direction of the sheet. The tension acting on the sheet is controlled by the speed at which the precursor fiber sheet is supplied into the heating furnace and the speed at which the sheet is drawn from the heating furnace.

In the porous carbon sheet production method of the invention, two or more precursor fiber sheets can be arranged above and below in parallel to each other with a distance kept between them, for being simultaneously supplied into the heating furnace. Further, two or more precursor fiber sheets can be arranged in parallel to each other side by side in the direction to cross the running direction, for being simultaneously supplied into the heating furnace. According to this method, the porous carbon sheet production efficiency can be enhanced. However, it is preferred that the number of the precursor fiber sheets to be supplied simultaneously into the heating furnace is 5 or less, for ensuring uniform heat treatment of the respective precursor fiber sheets.

In the porous carbon sheet production method of the invention, the precursor fiber sheet supplied to run into the heating furnace having a heat treatment region of 1,600° C. or higher is introduced from the opening at the inlet of the heating furnace into the furnace, heat-treated in the heated space, and delivered from the opening at the outlet of the heating furnace, to become the porous carbon sheet. It is preferred that the porous carbon sheet running after having been delivered from the heating furnace is wound as a roll by a sheet winding mechanism installed outside the heating furnace.

In the heating furnace, it is preferred that bending members to be kept in contact with both the surfaces of the running precursor fiber sheet at a temperature of 1,600° C. or higher are installed. The bending members can prevent the porous carbon sheet from being wrinkled and from becoming uneven. The bending members are installed on the floor, the ceiling or between the floor and the ceiling of the heating furnace. It is preferred that each of the bending members is a bar installed in the direction to cross the running direction of the sheet so that the overall width of the sheet can contact it, but it can also be a plate as the case may be.

A bar refers to a piece, the cross sectional form of which is such that the ratio between the long side and the short side is within 4 times. If a bar is used, the height of the bending member can be kept low. Further, the contact length with the sheet can be shortened, to prevent the wear of the sheet to be brought into contact with the bar. It is preferred that the bar is formed of carbon inexpensive and chemically stable in an inert atmosphere.

It is desirable that the heating furnace having a heat treatment region of 1,600° C. or higher has a height in the range of 20 to 300 mm between the furnace floor and the furnace ceiling. A preferred range is 60 to 200 mm. The height shows the height in which the sheet can pass through. If the height in the furnace is too low, many bending members with a small contact angle must be installed to repeat bending frequently for preventing that the bent sheet contacts the ceiling or floor. If the height in the furnace is too high, the energy consumption by radiation from the furnace increases.

In the case where a carbon bar is used as the bending member, it is preferred that the carbon bar as the bending member is curved entirely or partially on the surface to be kept in contact with the sheet, for example, like the bending members 132 shown in FIG. 14, to prevent that the sheet is excessively bent and to prevent that the bending member is worn. It is preferred that the number of the bars as bending members each installed in the direction to cross the running direction of the sheet (hereinafter called cross bars) is in the range of 1 to 10. A more preferred range is 3 to 8, and a further more preferred range is 5 to 7. One or more cross bars are independently installed in the furnace, or one or more cross bars combined with both side plates to form something like a ladder is installed as one bending member.

It is preferred that plural cross bars have such projections that can be connected with each other for integration. If plural cross bars are provided as an integral member, it can be easily fixed in the furnace, inserted in the furnace, taken out of the furnace and moved in the furnace.

Figure 16:
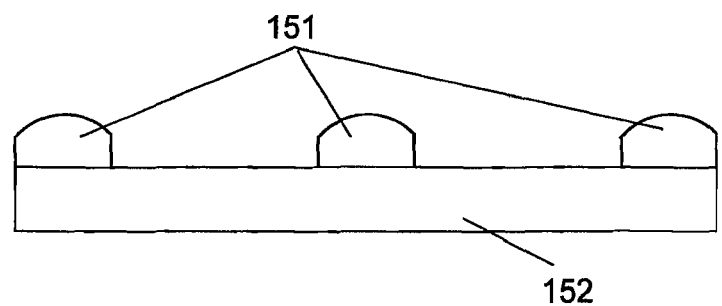
FIG. 16 is a side view showing an example of a ladder-like bending member used in a mode of the carbonizing step in a porous carbon sheet production process of the invention.
Figure 17:
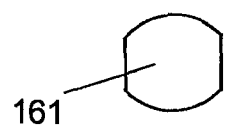
FIG. 17 is a sectional view showing a cross bar in the bending member shown in FIG. 16.

FIG. 16 is a schematic side view showing a bending member like a ladder in which three cross bars 151 are fixed to both side plates (both longitudinal bars) 152. FIG. 17 is a cross sectional view of a cross bar 161 having the same form as that of the cross bar 151 of FIG. 16. In the case where the ladder-like bending member shown in FIG. 16 is placed on the furnace floor, the bottom faces of the side plates (horizontal bars) 152 contact the furnace floor, to form gaps below the cross bars 151. So, the sheet can be passed above and below the cross bars 151 alternately, to run.

If the form of the bending member is selected, the bending member only can be carried into and from the heating furnace even if the heating furnace is heated to 1,600° C. or higher. So, the bending member can be exchanged without cooling or suspending the heating furnace.

When the bending member is installed or exchanged in the furnace, the bending member is inserted into the furnace, for example, from the inlet or the outlet of the furnace and moved into the region heated to 1,600° C. or higher, or the bending member is moved from the region heated to 1,600° C. or higher and taken out from the inlet or the outlet of the furnace. So, an openable shutter can be installed at the inlet or the outlet of the furnace. For allowing the bending member to slide on the floor of the heating furnace, it is preferred that the furnace floor is flat. It is also preferred that a carrying means such as a belt or chain for carrying the bending member is installed in the heating furnace.

The definitions and/or measuring methods of respective property values of the porous carbon sheets in the following examples are as follows.

Thickness of a precursor fiber sheet and the thickness of the sheet after the forming step:

The measuring method is the same as that for the thickness of a porous carbon sheet described before.

Standard deviation of the thickness of a precursor fiber sheet in the longitudinal direction after the forming step:

The standard deviation of the thickness of a precursor fiber sheet in the longitudinal direction after the forming step was calculated by measuring the thicknesses of the sheet at 5 cm intervals at 100 points or more in the longitudinal direction.

The thickness measuring method is as described before.

Standard Deviation of the Thickness of a Porous Carbon Sheet in the Longitudinal Direction:

The standard deviation of the thickness of a porous carbon sheet in the longitudinal direction was calculated according to the same method as that for the precursor fiber sheet after the forming step.

Warp Height of a Porous Carbon Sheet:

In the case where a porous carbon fiber sheet cut to be a 200 mm square is placed on a flat plate, if the sheet is wrinkled or uneven, the sheet warps to form a high portion. The warp height of a porous carbon sheet was obtained by measuring the height of the highest position of the sheet.

Example 1

Polyacrylonitrile-based carbon fibers "Torayca (registered trademark)" T300-6K (average single fiber diameter 7 μm, number of single fibers 6,000) produced by Toray Industries, Inc. were cut to have a length of 12 mm, for obtaining short carbon fibers. With water as a paper making medium, the short carbon fibers were continuously picked up on a wire cloth, and the picked up carbon fiber paper sheet was further immersed in 10 wt % polyvinyl alcohol aqueous solution and dried, to obtain a long carbon fiber paper sheet of about 22 g/m$^2$ in the unit area weight of short carbon fibers. It was wound as a roll. The deposition amount of polyvinyl alcohol corresponded to 20 parts by weight per 100 parts by weight of the carbon fiber paper sheet.

Scaly graphite BF-5A (average particle size 5 μm) produced by Chuetsu Graphite Works Co., Ltd., a phenol resin and methanol, were mixed at a ratio by weight of 1:5:24, to prepare a dispersion. The carbon fiber paper sheet was continuously impregnated with the dispersion to ensure that 192 parts by weight of the phenol resin were impregnated per 100 parts by weight of the short carbon fibers, and the resin-impregnated carbon fiber paper sheet was dried at 90° C. for 3 minutes. It was wound as a roll. The phenol resin used was a resin obtained by mixing resol type phenol resin and novolak type phenol resin at a ratio by weight of 1:1.

Hot plates 33 and 34 were set in a 100-ton press produced by K. K. Kawajiri to ensure that the hot plates 33 and 34 became parallel to each other, and spacers 35 and 35 were placed on the lower hot plate 34. At a hot plate temperature of 170° C. and a pressure of 0.8 MPa, the press was opened and closed repetitively, while the resin-impregnated carbon fiber paper sheet covered with releasing paper sheets on both sides was carried intermittently to be heated and pressurized for 6 minutes in total at each portion, as compression treatment. The substantial clearance formed for forming the resin-impregnated carbon fiber paper sheet excluding the thickness of the releasing paper sheets was 0.30 mm. Further, the effective pressurization length LP of the hot plates was 1,200 mm, and the feed LF of the intermittently carried precursor fiber sheet was 100 mm, to achieve LF/LP=0.08. That is, heating and pressurization for 30 seconds, press opening and feed (100 mm) of carbon fiber paper sheet were repeated for compression treatment, and the treated carbon fiber paper sheet was wound as a roll.

The compressed carbon fiber paper sheet was introduced as a precursor fiber sheet into a heating furnace internally kept in a nitrogen gas atmosphere and having the highest temperature of 2,000° C., and while the precursor fiber sheet was continuously run in the heating furnace, it was heat-treated at a heating rate to of about 500° C./min (400° C./min up to 650° C. and 550° C./min at temperatures higher than 650° C.). The obtained porous carbon sheet 11 was wound as a roll. The property values of the obtained porous carbon sheet 11, production conditions and evaluation results are shown below. The pore size distribution of the porous carbon sheet 11 was measured by the mercury penetration method, and the result is shown in FIG. 1.

Pore mode diameter: 58 μm

Differential pressure with air permeated in the thickness direction: 6 mm Aq/mm

Electrical resistivity in the thickness direction: 130 mΩ·cm

Residual deformation by compression in the thickness direction: 6 μm

Standard deviation of thickness in the longitudinal direction: 6.5 μm

Warp height: 4.5 mm

Density: 0.24 g/cm$^3$

Thickness: 0.20 mm

Unit area weight: 48 g/m$^2$

Unit area weight of the short carbon fibers: 22 g/m$^2$

Unit area weight of the thermosetting resin: 42 g/m$^2$

Ratio of the weight of the thermosetting resin to the weight of the short carbon fibers: 1.9

Average fiber diameter of the carbon fibers: 7 μm

Thickness of the resin-impregnated carbon fiber paper sheet: 0.40 mm

Thickness of the resin-impregnated carbon fiber paper sheet after the forming step: 0.32 mm Density of the short carbon fibers after the forming step: 0.07 g/cm$^3$ Density of the thermosetting resin after the forming step: 0.13 g/cm$^3$ Standard deviation of the thickness of the precursor fiber sheet after the forming step: 10.4 μm Heating rate of the carbonizing step: 500° C./min Highest temperature of the carbonizing step: 2,000° C.

Example 2

A porous carbon sheet 11, was obtained as described in Example 1, except that the unit area weight of the short carbon fibers in the paper making step was 18 g/m$^2$, and that 276 parts by weight of the phenol resin were impregnated per 100 parts by weight of the short carbon fibers. The property values of the obtained porous carbon sheet 11, production conditions and evaluation results are shown below.

Pore mode diameter: 65 μm

Differential pressure with air permeated in the thickness direction: 5 mm Aq/mm

Electrical resistivity in the thickness direction: 110 mΩ·cm

Residual deformation by compression in the thickness direction: 7 μm

Standard deviation of thickness in the longitudinal direction: 6.8 μm

Warp height: 4.3 mm

Density: 0.25 g/cm$^3$

Thickness: 0.20 mm

Unit area weight: 50 g/m$^2$

Unit area weight of the short carbon fibers: 18 g/m$^2$

Unit area weight of the thermosetting resin: 48 g/m$^2$

Ratio of the weight of the thermosetting resin to the weight of the short carbon fibers: 2.7

Average fiber diameter of the carbon fibers: 7 μm

Thickness of the resin-impregnated carbon fiber paper sheet: 0.39 mm

Thickness of the resin-impregnated carbon fiber paper sheet after the forming step: 0.31 mm Density of the short carbon fibers after the forming step: 0.06 g/cm$^3$ Density of the thermosetting resin after the forming step: 0.15 g/cm³

Standard deviation of the thickness of the precursor fiber sheet after the forming step: 10.5 μm Heating rate of the carbonizing step: 500° C./min Highest temperature of the carbonizing step: 2,000° C.

Example 3

A porous carbon sheet 11 was obtained as described in Example 1, except that the unit area weight of the short carbon to fibers in the paper making step was 26 g/m², and that 175 parts by weight of the phenol resin were impregnated per 100 parts by weight of the short carbon fibers. The property values of the obtained porous carbon sheet 11, production conditions and evaluation results are shown below.

Pore mode diameter: 50 μm

Differential pressure with air permeated in the thickness direction: 9 mm Aq/mm

Electrical resistivity in the thickness direction: 150 mΩ·cm

Residual deformation by compression in the thickness direction: 5 μm

Standard deviation of thickness in the longitudinal direction: 6.4 μm

Warp height: 4.9 mm

Density: 0.27 g/cm³

Thickness: 0.20 mm

Unit area weight: 54 g/m²

Unit area weight of the short carbon fibers: 26 g/m²

Unit area weight of the thermosetting resin: 46 g/m²

Ratio of the weight of the thermosetting resin to the weight of the short carbon fibers: 1.8

Average fiber diameter of the carbon fibers: 7 μm

Thickness of the resin-impregnated carbon fiber paper sheet: 0.42 mm

Thickness of the resin-impregnated carbon fiber paper sheet after the forming step: 0.33 mm Density of the short carbon fibers after the forming step: 0.08 g/cm³

Density of the thermosetting resin after the forming step: 0.14 g/cm³

Standard deviation of the thickness of the precursor fiber sheet after the forming step: 10.6 μm Heating rate of the carbonizing step: 500° C./min Highest temperature of the carbonizing step: 2,000° C.

Example 4

Polyacrylonitrile-based carbon fibers "Torayca (registered trademark)" T300-6K (average single fiber diameter 7 μm, number of single fibers 6,000) produced by Toray Industries, Inc. were cut to have a length of 12 mm, for obtaining short carbon fibers. With water as a paper making medium, the short carbon fibers were picked up on a wire cloth, and the picked up carbon fiber paper sheet was immersed in 10 wt % polyvinyl alcohol aqueous dispersion and dried, to obtain a carbon fiber paper sheet of about 22 g/m² in the unit area weight of short carbon fibers. The deposition amount of polyvinyl alcohol corresponded to 10 parts by weight per 100 parts by weight of the carbon fiber paper sheet.

Then, the carbon fiber paper sheet was impregnated with 10 wt % phenol resin methanol solution, to ensure that 220 parts by weight of the phenol resin were impregnated per 100 parts by weight of the short carbon fibers, and the impregnated carbon fiber paper sheet was dried at 90° C. The phenol resin used was a resin obtained by mixing resol type phenol resin and novolak type phenol resin at a ratio by weight of 1:1.

Hot plates were set to be parallel to each other in a 100-ton press produced by K. K. Kawajiri, and spacers were interposed between the hot plates. At a hot plate temperature of 150° C. and a pressure of 0.8 MPa, the resin-impregnated carbon fiber paper sheet covered on both sides with releasing paper sheets was pressed for 30 minutes as compression treatment. The substantial clearance set for forming the resin-impregnated carbon fiber paper sheet was 0.33 mm.

Subsequently, the compressed carbon fiber paper sheet as a porous fiber sheet was heat-treated at 2,000° C. in a batch type heating furnace internally kept in a nitrogen gas atmosphere. The heating rate was 1.4° C./min (1° C./min up to 800° C. and 2° C./min at temperatures higher than 800° C.). The property values of the obtained porous carbon sheet 11 are shown below.

Pore mode diameter: 60 μm

Differential pressure with air permeated in the thickness direction: 5 mm Aq/mm

Electrical resistivity in the thickness direction: 100 mΩ·cm

Residual deformation by compression in the thickness direction: 5 μm

Standard deviation of thickness in the longitudinal direction: 6.6 μm

Warp height: 4.3 mm

Density: 0.22 g/cm³

Thickness: 0.21 mm

Unit area weight: 47 g/m²

Unit area weight of the short carbon fibers: 22 g/m²

Unit area weight of the thermosetting resin: 48 g/m²

Ratio of the weight of the thermosetting resin to the weight of the short carbon fibers: 2.2

Average fiber diameter of the carbon fibers: 7 μm

Thickness of the resin-impregnated carbon fiber paper sheet: 0.40 mm

Thickness of the resin-impregnated carbon fiber paper sheet after the forming step: 0.35 mm Density of the short carbon fibers after the forming step: 0.06 g/cm³

Density of the thermosetting resin after the forming step: 0.14 g/cm³

Standard deviation of the thickness of the precursor fiber sheet after the forming step: 11.0 μm Heating rate of the carbonizing step: 1.4° C./min Highest temperature of the carbonizing step: 2,000° C.

Example 5

A porous carbon sheet 11 was obtained as described in Example 1, except that the forming step 23 was as explained below.

As described in Example 1, a resin-impregnated carbon fiber paper sheet was prepared, and the sheet 82 was trimmed to have a length of 100 m and a width of 30 cm. It was held between so a pair of stainless steel belts 84 coated on both the surfaces with PTFE (as fluorine) and continuously guided into a die 83 with a slit heated to a temperature of 230° C. at a rate of 0.6 m/min, to be heated and formed, for obtaining a precursor fiber sheet 81 with a length of 100 mm and a width of 30 cm after the forming step.

The slit die 83 had stainless steel blocks 83*a* and 83*b* and stainless steel sheets kept between the blocks as spacers 83SP. As the pair of belts 84, a pair of stainless steel endless belts coated on both the surfaces with PTFE (as fluorine) was used.

The endless belts 84 respectively had a thickness of 200 μm, a width of 40 cm and a length of 2 m. The fluorine resin layers formed on the stainless steel belts were respectively 20 μm. Roller chains with attachments were installed as power transmitting portions 85 at both the edges of the surfaces in contact with the die 83 (the inside surfaces of the endless belts 84) over the entire circumference. Power was transmitted to the endless belts 84 from sprockets with a diameter of 30 cm as drive portions 86 through the roller chains. Further, the metal blocks 83a and 83b respectively had a length of 18 cm, a width of 50 cm and a height of 5 cm, and were radiused on the long sides corresponding to the slit surfaces and mirror-finished on the slit surfaces, having grooves 83G formed for allowing the roller chains attached to the endless belts 84 to pass through. The stainless steel sheets as spacers 835P respectively had a length of 18 cm, a width of 3 cm and a thickness of 620 μm. The property values of the obtained porous carbon sheet 11 are shown below.

Pore mode diameter: 59 μm
Differential pressure with air permeated in the thickness direction: 6 mm Aq/mm
Electrical resistivity in the thickness direction: 120 mΩ·cm
Residual deformation by compression in the thickness direction: 4 μm
Standard deviation of thickness in the longitudinal direction: 3.4 μm
Warp height: 4.5 mm
Density: 0.25 g/cm$^3$
Thickness: 0.20 mm
Unit area weight: 49 g/m$^2$
Unit area weight of the short carbon fibers: 22 g/m$^2$
Unit area weight of the thermosetting resin: 43 g/m$^2$
Ratio of the weight of the thermosetting resin to the weight of the short carbon fibers: 2.0
Average fiber diameter of the carbon fibers: 7 μm
Thickness of the resin-impregnated carbon fiber paper sheet: 0.41 mm
Thickness of the resin-impregnated carbon fiber paper sheet after the forming step: 0.33 mm
Density of the short carbon fibers after the forming step: 0.07 g/cm$^3$
Density of the thermosetting resin after the forming step: 0.13 g/cm$^3$
Standard deviation of the thickness of the precursor fiber sheet after the forming step: 5.7 μm
Heating rate of the carbonizing step: 500° C./min
Highest temperature of the carbonizing step: 2,000° C.

Example 6

A porous carbon sheet 11 was obtained as described in Example 1, except that the carbonizing step 24 was as explained below.

A resin-impregnated carbon fiber paper sheet after the forming step was prepared as described in Example 1. The carbon fiber paper sheet was introduced as a precursor fiber sheet into a heating furnace internally kept in a nitrogen gas atmosphere and having the highest temperature of 2,000° C., and while it was continuously run in the heating furnace, it was heat-treated at a heating rate of about 500° C./min (400° C./min up to 650° C. and 550° C./min at temperatures higher than 650° C.) and wound as a roll.

For heat-treating, a ladder-like bending member with cross bars disposed as shown in FIG. 14 was placed on the floor of the heating furnace, to bend the precursor fiber sheet. The cross bars respectively had an oval cross sectional form with a height of 25 mm and a width of 25 mm obtained by curving the top and bottom faces. With the three cross bars of the bending member as cross bars 132a, 132b and 132c in the order of contact by the sheet, the cross bar 132a was placed at a position with a temperature of 1,750° C., and the cross bar 132c was placed at a position with a temperature of 1,950° C. The bending angles of the sheet were 7° in the portion in contact with the cross bar 132a, 14° in the portion in contact with the cross bar 132b and 7° in the portion in contact with the cross bar 132c. The property values of the obtained porous carbon sheet 11 are shown below.

Pore mode diameter: 58 μm
Differential pressure with air permeated in the thickness direction: 6 mm Aq/mm
Electrical resistivity in the thickness direction: 110 mΩ·cm
Residual deformation by compression in the thickness direction: 6 μm
Standard deviation of thickness in the longitudinal direction: 6.7 μm
Warp height: 1.0 mm
Density: 0.24 g/cm$^3$
Thickness: 0.20 mm
Unit area weight: 48 g/m$^2$
Unit area weight of the short carbon fibers: 22 g/m$^2$
Unit area weight of the thermosetting resin: 42 g/m$^2$
Ratio of the weight of the thermosetting resin to the weight of the short carbon fibers: 1.9
Average fiber diameter of the carbon fibers: 7 μm
Thickness of the resin-impregnated carbon fiber paper sheet: 0.40 mm
Thickness of the resin-impregnated carbon fiber paper sheet after the forming step: 0.32 mm
Density of the short carbon fibers after the forming step: 0.07 g/cm$^3$
Density of the thermosetting resin after the forming step: 0.13 g/cm$^3$
Standard deviation of the thickness, of the precursor fiber sheet after the forming step: 10.8 μm
Heating rate of the carbonizing step: 500° C./min
Highest temperature of the carbonizing step: 2,000° C.

Example 7

A porous carbon sheet 11 was obtained, as described in Example 5, except the carbonizing step 24 was explained below.

A resin-impregnated carbon fiber paper sheet after the forming step was prepared as described in Example 5. The carbon fiber paper sheet was introduced as a precursor fiber sheet into a heating furnace internally kept in a nitrogen gas atmosphere and having the highest temperature of 2,000° C., and while it was continuously run in the heating furnace, it was heat-treated at a heating rate of about 500° C./min (400° C./min up to 650° C. and at 550° C./min at temperatures higher than 650° C.) and wound as a roll.

For heat-treating, a ladder-like bending member with cross bars disposed as shown in FIG. 14 was placed on the floor of the heating furnace, to bend the sheet. The cross bars respectively had a cross sectional form with a height of 25 mm and a width of 25 mm, and as shown in FIG. 17, the bottom outer circumferential line was outwardly curved, while both the ends of the top outer circumferential line and both the ends of the bottom outer circumferential line were connected by straight lines. With the three cross bars of the bending member as cross bars 132a, 132b and 132c in the order of contact by the sheet, the cross bar 132a was placed at a position with a temperature of 1,750° C., and the cross bar 132c was placed at a position with a temperature of 1,950° C. The bending angles of the sheet were 7° in the portion in contact with the cross bar 132a, 14° in the portion in contact with the cross bar 132b and 7° in the portion in contact with the cross bar 132c. The property values of the obtained porous carbon sheet 11 are shown below.

Pore mode diameter: 57 μm
Differential pressure with air permeated in the thickness direction: 6 mm Aq/mm
Electrical resistivity in the thickness direction: 110 mΩ·cm
Residual deformation by compression, in the thickness direction: 4 μm
Standard deviation of thickness in the longitudinal direction: 3.5 μm
Warp height: 0.9 mm
Density: 0.24 g/cm$^3$
Thickness: 0.20 mm
Unit area weight: 48 g/m$^2$
Unit area weight of the short carbon fibers: 22 g/m$^2$
Unit area weight of the thermosetting resin: 42 g/m$^2$
Ratio of the weight of the thermosetting resin to the weight of the short carbon fibers: 1.9
Average fiber diameter of the carbon fibers: 7 μm
Thickness of the resin-impregnated carbon fiber paper sheet: 0.40 mm
Thickness of the resin-impregnated carbon fiber paper sheet after the forming step: 0.32 mm
Density of the short carbon fibers after the forming step: 0.07 g/cm$^3$
Density of the thermosetting resin after the forming step: 0.13 g/cm$^3$
Standard deviation of the thickness of the precursor fiber sheet after the forming step: 5.6 μm
Heating rate of the carbonizing step: 500° C./min
Highest temperature of the carbonizing step: 2,000° C.

Comparative Example 1

Polyacrylonitrile-based carbon fibers "Torayca (registered trademark)" T300-6K (average single fiber diameter 7 μm, number of single fibers 6,000) produced by Toray Industries, Inc. were cut to have a length of 12 mm, for obtaining short carbon fibers. With water as a paper making medium, the short carbon fibers were continuously picked up on a wire cloth, and the obtained carbon fiber paper sheet was further immersed in 10 wt % polyvinyl alcohol aqueous solution and dried, to obtain a long carbon fiber paper sheet of about 14 g/m$^2$ in the unit area weight of short carbon fibers. It was wound as a roll. The deposition amount of polyvinyl alcohol corresponded to 20 parts by weight per 100 parts by weight of the carbon fiber paper sheet.

Scaly graphite BF-5A (average particle size 5 μm) produced by Chuetsu Graphite Works Co. Ltd., a phenol resin and methanol, were mixed at a ratio by weight of 1:1:8, to prepare a dispersion. The carbon fiber paper sheet was continuously impregnated with the dispersion to ensure that 158 parts by weight of the phenol resin were impregnated per 100 parts by weight of the short carbon fibers, and the resin-impregnated carbon fiber paper sheet was dried at 90° C. for 3 minutes. It was wound as a roll. The phenol resin used was a resin obtained by mixing resol type phenol resin and novolak type phenol resin at a ratio by weight of 1:1.

The resin-impregnated carbon fiber paper sheet was heated in an oven set at 170° C. for 6 minutes, for heat treatment.

The heat-treated carbon fiber paper sheet was introduced as a precursor fiber sheet into a heating furnace internally kept in a nitrogen gas atmosphere and having the highest temperature of 2,000° C., and while it was continuously run in the heating furnace, it was heat-treated at a heating rate of about 500° C./min (400°/min up to 650° C., and 550° C./min at temperatures higher than 650° C.) and wound as a roll. The property values of the obtained porous carbon sheet, production conditions and evaluation results are shown below.

Pore mode diameter: 93 μm
Differential pressure with air permeated in the thickness direction: 6 mm Aq/mm
Electrical resistivity in the thickness direction: 100 mΩ·cm
Residual deformation by compression in the thickness direction: 32 μm
Standard deviation of thickness in the longitudinal direction: 8.4 μm
Warp height: 4.5 mm
Density: 0.21 g/cm$^3$
Thickness: 0.21 mm
Unit area weight: 44 g/m$^2$
Unit area weight of the short carbon fibers: 14 g/m$^2$
Unit area weight of the thermosetting resin: 22 g/m$^2$
Ratio of the weight of the thermosetting resin to the weight of the short carbon fibers: 1.6
Average fiber diameter of the carbon fibers: 7 μm
Thickness of the resin-impregnated carbon fiber paper sheet: 0.35 mm
Thickness of the resin-impregnated carbon fiber paper sheet after the forming step: 0.34 mm
Density of the short carbon fibers after the forming step: 0.04 g/cm$^3$
Density of the thermosetting resin after the forming step: 0.06 g/cm$^3$
Standard deviation of the thickness of the precursor fiber sheet after the forming step: 13.7 μm
Heating rate of the carbonizing step: 500° C./min
Highest temperature of the carbonizing step: 2,000° C.

Comparative Example 2

A porous carbon sheet was obtained as described in Comparative Example 1, except that 221 parts by weight of the phenol resin were impregnated per 100 parts by weight of the short carbon fibers. The property values of the obtained porous carbon sheet, production conditions and evaluation results are shown below.

Pore mode diameter: 91 μm
Differential pressure with air permeated in the thickness direction: 14 mm Aq/mm
Electrical resistivity in the thickness direction: 80 mΩ·cm
Residual deformation by compression in the thickness direction: 21 μm
Standard deviation of thickness in the longitudinal direction: 8.8 μm
Warp height: 4.2 mm
Density: 0.27 g/cm$^3$
Thickness: 0.22 mm
Unit area weight: 59 g/m$^2$
Unit area weight of the short carbon fibers: 14 g/m$^2$
Unit area weight of the thermosetting resin: 31 g/m$^2$
Ratio of the weight of the thermosetting resin to the weight of the short carbon fibers: 2.2
Average fiber diameter of the carbon fibers: 7 μm
Thickness of the resin-impregnated carbon fiber paper sheet: 0.36 mm
Thickness of the resin-impregnated carbon fiber paper sheet after the forming step: 0.34 mm
Density of the short carbon fibers after the forming step: 0.04 g/cm$^3$
Density of the thermosetting resin after the forming step: 0.09 g/cm$^3$ Standard deviation of the thickness of the precursor fiber sheet after the forming step: 13.4 μm
Heating rate of the carbonizing step: 500° C./min
Highest temperature of the carbonizing step: 2,000° C.

Comparative Example 3

Polyacrylonitrile-based carbon fibers "Torayca (registered trademark)" T300-6K (average single fiber diameter 7 μm, number of single fibers 6,000) produced by Toray Industries, Inc. were cut to have a length of 12 mm, for obtaining short carbon fibers. With water as a paper making medium, the short carbon fibers were picked up on a wire cloth, to make a carbon fiber paper sheet, and it was further immersed in 20 wt % polyvinyl alcohol aqueous dispersion and dried, to obtain a carbon fiber paper sheet of about 25 g/m² in the unit area weight of short carbon fibers. The deposition amount of polyvinyl alcohol corresponded to 10 parts by weight per 100 parts by weight of the carbon fiber paper sheet.

Then, the carbon fiber paper sheet was impregnated with 10 wt % phenol resin methanol solution, to ensure that 69 parts by weight of the phenol resin were impregnated per 100 parts by weight of the short carbon fibers, and the resin-impregnated carbon fiber paper sheet was dried at 90° C. The phenol resin used was a resin obtained by mixing resol type phenol resin and novolak type phenol resin at a ratio by weight of 1:1.

Hot plates were set to be parallel to each other on a 100-ton press produced by K. K. Kawajiri, and at a hot plate temperature of 150° C. and a pressure of 0.5 MPa, a laminate consisting of two resin-impregnated carbon fiber paper sheets, each as described above, and covered with releasing paper sheets on both sides was pressed for 30 minutes, as compression treatment.

Then, the compressed carbon fiber paper sheet was heat-treated as a precursor fiber sheet at 2,000° C. in a batch type heating furnace internally kept in a nitrogen gas atmosphere. The heating rate was 1.4° C./min (1° C./min up to 800° C. and 2° C./min at temperatures higher than 800° C.). The property values of the obtained porous carbon sheet are shown below.
Pore mode diameter: 39 μm
Differential pressure with air permeated in the thickness, direction: 13 mm Aq/mm
Electrical resistivity in the thickness direction: 150 mΩ·cm
Residual deformation by compression in the thickness direction: 10 μm
Standard deviation of thickness in the longitudinal direction: 6.4 μm
Warp height: 4.9 mm
Density: 0.30 g/cm³
Thickness: 0.22 mm
Unit area weight: 66 g/m²
Unit area weight of the short carbon fibers: 50 g/m² (2 sheets)
Unit area weight of the thermosetting resin: 35 g/m² (2 sheets)
Ratio of the weight of the thermosetting resin to the weight of the short carbon fibers: 0.7
Average fiber diameter of the carbon fibers: 7 μm
Thickness of the resin-impregnated carbon fiber paper sheet: 0.80 mm (2 sheets)
Thickness of the resin-impregnated carbon fiber paper sheet after the forming step: 0.25 mm
Density of the short carbon fibers after the forming step: 0.20 g/cm³
Density of the thermosetting resin after the forming step: 0.14 g/cm³
Standard deviation of the thickness of the precursor fiber sheet after the forming step: 7.4 μm
Heating rate of the carbonizing step: 1.4° C./min
Highest temperature of the carbonizing step: 2,000° C.

Comparative Example 4

A porous carbon sheet was obtained as described in Comparative Example 3, except that 49 parts by weight of the phenol resin were impregnated per 100 parts by weight of the short carbon fibers. The property values of the obtained porous carbon sheet, production conditions and evaluation results are shown below.
Pore mode diameter: 41 μm
Differential pressure with air permeated in the thickness direction: 7 mm Aq/mm
Electrical resistivity in the thickness direction: 550 mΩ·cm
Residual deformation by compression in the thickness direction: 12 μm
Standard deviation of thickness in the longitudinal direction: 6.8 μm
Warp height: 4.7 mm
Density: 0.25 g/cm³
Thickness: 0.24 mm
Unit area weight: 61 g/m²
Unit area weight of the short carbon fibers: 50 g/m² (2 sheets)
Unit area weight of the thermosetting resin: 25 g/m² (2 sheets)
Ratio of the weight of the thermosetting resin to the weight of the short carbon fibers: 0.5
Average fiber diameter of the carbon fibers: 7 μm
Thickness of the resin-impregnated carbon fiber paper sheet: 0.80 mm (2 sheets)
Thickness of the resin-impregnated carbon fiber paper sheet after the forming step: 0.27 mm
Density of the short carbon fibers after the forming step: 0.19 g/cm³
Density of the thermosetting resin after the forming step: 0.09 g/cm³
Standard deviation of the thickness of the precursor fiber sheet after the forming step: 7.7 μm
Heating rate of the carbonizing step: 1.4° C./min
Highest temperature of the carbonizing step: 2,000° C.

Comparative Example 5

A porous carbon sheet was obtained as described in Example 1, except that the spacers were not disposed between the hot plates in the compression step 23 and that the pressure of the press was 0.1 MPa. The property values of the obtained porous carbon sheet, production conditions and evaluation results are shown below.
Pore mode diameter: 38 μm
Differential pressure with air permeated in the thickness direction: 25 mm Aq/mm
Electrical resistivity in the thickness direction: 70 mΩ·cm
Residual deformation by compression in the thickness direction: 7 μm
Standard deviation of thickness in the longitudinal direction: 3.5 μm
Warp height: 5.2 mm
Density: 0.44 g/cm³
Thickness: 0.11 mm
Unit area weight: 48 g/m²
Unit area weight of the short carbon fibers: 22 g/m²
Unit area weight of the thermosetting resin: 42 g/m²

Ratio of the weight of the thermosetting resin to the weight of the short carbon fibers: 1.9

Average fiber diameter of the carbon fibers: 7 μm

Thickness of the resin-impregnated carbon fiber paper sheet: 0.40 mm

Thickness of the resin-impregnated carbon fiber paper sheet after the forming step: 0.13 mm Density of the short carbon fibers after the forming step: 0.17 g/cm$^3$ Density of the thermosetting resin after the forming step: 0.32 g/cm$^3$ Standard deviation of the thickness of the precursor fiber sheet after the forming step: 4.3 μm Heating rate of the carbonizing step: 500° C./min Highest temperature of the carbonizing step: 2,000° C.

Among the property values of the porous carbon sheets, production conditions and evaluation results concerned with the above-mentioned examples and comparative examples, major ones are listed in Table 1.

TABLE 1

| | Pore mode diameter [μm] | Average fiber diameter of short carbon fibers [μm] | Unit area weight of short carbon fibers [g/m$^2$] | Unit area weight of thermo-setting resin [g/m$^2$] | Differential pressure with air permeated in thickness direction [mmAg/mm] |
|---|---|---|---|---|---|
| Example 1 | 58 | 7 | 22 | 42 | 6 |
| Example 2 | 65 | 7 | 18 | 48 | 5 |
| Example 3 | 50 | 7 | 26 | 46 | 9 |
| Example 4 | 60 | 7 | 22 | 48 | 5 |
| Example 5 | 59 | 7 | 22 | 43 | 6 |
| Example 6 | 58 | 7 | 22 | 42 | 6 |
| Example 7 | 57 | 7 | 22 | 42 | 6 |
| Comparative Example 1 | 93 | 7 | 14 | 22 | 6 |
| Comparative Example 2 | 91 | 7 | 14 | 31 | 4 |
| Comparative Example 3 | 39 | 7 | 50 | 35 | 13 |
| Comparative Example 4 | 41 | 7 | 50 | 25 | 7 |
| Comparative Example 5 | 38 | 7 | 2 | 42 | 25 |

| | Electrical resistivity in thickness direction [mΩ · cm] | Residual deformation by compression in thickness direction [μm] | Standard deviation of thickness in longitudinal direction [μm] | Warp height [mm] |
|---|---|---|---|---|
| Example 1 | 130 | 6 | 6.5 | 4.5 |
| Example 2 | 110 | 7 | 6.8 | 4.3 |
| Example 3 | 150 | 5 | 6.4 | 4.9 |
| Example 4 | 100 | 5 | 6.6 | 4.3 |
| Example 5 | 120 | 4 | 3.4 | 4.5 |
| Example 6 | 110 | 6 | 6.7 | 1.0 |
| Example 7 | 110 | 4 | 3.5 | 0.9 |
| Comparative Example 1 | 100 | 32 | 8.4 | 4.5 |
| Comparative Example 2 | 80 | 21 | 8.8 | 4.2 |
| Comparative Example 3 | 150 | 10 | 6.4 | 4.9 |
| Comparative Example 4 | 550 | 12 | 6.8 | 4.7 |
| Comparative Example 5 | 70 | 7 | 3.5 | 5.2 |

Since the porous carbon sheets 11 of Examples 1 through 7 were produced with the unit area weight of the short carbon fibers 12 kept in a range from 15 to 30 g/m$^2$, with the unit area weight of the thermosetting resin kept in a range from 30 to 80 g/m$^2$ and with a certain clearance formed in the forming step 23, the pore mode diameters were controlled in an appropriate range from 45 to 90 μm. Therefore, the porous carbon sheets 11 of Examples 1 through 7 showed satisfactory values in all the evaluation results concerning the electrical resistivity in the thickness direction, the residual deformation by compression in the thickness direction and the differential pressure with air permeated in the thickness direction. Thus, the porous carbon sheets respectively have all of the properties required for them as materials of gas diffusion layers of fuel cells.

Further, for the porous carbon sheets 11 of Examples 5 and 7, the thickness of each precursor fiber sheet was controlled by the clearance of the slit formed in the die in the forming step 23. So, even in the case where a material fluctuating in unit area weight was used, high pressures acted on the portions with high unit area weights and low pressures acted on the portions with low unit area weights. Therefore, the porous carbon sheets 11 of Examples 5 and 7 were 3.4 μm and 3.5 μm in the standard deviation of thickness in the longitudinal direction, showing high thickness accuracy.

Furthermore, the porous carbon sheets 11 of Examples 6 and 7 were produced by bending the precursor fiber sheets in the longitudinal direction using a bending member in the carbonizing step 24. So, since the sheets were unlikely to be bent in the transverse direction, they were unlikely to be wrinkled. Further, since they were brought into contact with the bending member, they could be unlikely to be wrinkled and to be uneven. Therefore, the porous carbon sheets 11 of Examples 6 and 7 were 1.0 and 0.9 mm in warp height respectively, and showing very little wrinkling and unevenness.

On the other hand, in Comparative Examples 1 and 2, since the resin was cured without compression treatment, the porous carbon sheets had large pore mode diameters of 93 and 91 μm respectively, and were as large as 32 and 21 μm respectively in the residual deformation by compression in the thickness direction.

Further, in Comparative Examples 3 and 4, the unit area weight of short carbon fibers was as large as 50 g/m$^2$, and in the compression step, heating and pressurization treatment was performed at a high press pressure without forming the clearance using spacers. So, the pore mode diameters of the porous carbon sheets were as small as 39 and 41 μm respectively. Therefore, in Comparative Example 3 in which the unit area weight of the thermosetting resin was as high as 35 g/m$^2$, the electrical resistivity in the thickness direction was as low as 150 mΩ·cm, but the differential pressure with air permeated in the thickness direction was as high as 14 mm Aq/mm. In Comparative Example 4 in which the unit area weight of the thermosetting resin was as high as 25 g/m$^2$, the differential pressure with air permeated in the thickness direction was as high as 7 mm Aq/mm, but the electrical resistivity in the thickness direction was as low as 550 mΩ·cm. Therefore, in the case where the pore mode diameter is small, both the differential pressure with air permeated in the thickness direction and the electrical resistivity in the thickness direction cannot be satisfied.

Furthermore, in Comparative Example 5, the same resin-impregnated carbon fiber paper sheet as that of Example 1 was used, but since no clearance was formed using spacers or the like, the thickness of the resin-impregnated carbon fiber paper sheet after the compression step was as thin as 0.13 mm, even the heating and pressurization treatment was performed at a low press pressure of 0.1 MPa. Therefore, the pore mode diameter of the porous carbon sheet could not be controlled appropriately and was as small as 38 μm. So, the electrical resistivity in the thickness direction was as low as 70 mΩ·cm, but the differential pressure with air permeated in the thickness direction was as high as 25 mm Aq/mm.

As described above, the porous carbon sheet production method of the invention can provide a porous carbon sheet having all of the properties required as a porous carbon sheet used as the material of the gas diffusion layers of fuel cells, particularly high gas permeability, high conductivity and small residual deformation after compression.

INDUSTRIAL APPLICABILITY

The porous carbon sheet of the invention can have all of the properties required as carbon paper used as the gas diffusion layers of fuel cells, particularly high gas permeability, high conductivity and small residual deformation after compression, though it was difficult for the conventional porous carbon sheet to have all of the properties.

Since the porous carbon sheet of the invention has these properties, it can be preferably used as the material of the gas diffusion layers for the solid polymer fuel cells of motor vehicles. Further, in addition to the gas diffusion layers for solid polymer fuel cells, the porous carbon sheet of the invention can also be used in the electrode substrates of various cells such as direct methanol fuel cells, in the electrodes of dehydrators, etc. The applicability of the porous carbon sheet of the invention is not limited to those enumerated above.

The porous carbon sheet production method of the invention for the purpose of producing the porous carbon sheet of the invention comprises a forming step of treating a precursor fiber sheet containing short carbon fibers and a thermosetting resin for heating and forming them, and a carbonizing step of treating the thermosetting resin contained in the heated and formed precursor fiber sheet for carbonizing it, characterized in that hot plates having a certain clearance provided between them are used for forming the precursor fiber sheet in the forming step. The porous carbon sheet production method of the invention allows the production of a porous carbon sheet having all of high gas permeability, high conductivity and small residual deformation after compression, though it was difficult for a conventional porous carbon sheet to have all of the properties.

The invention claimed is:

1. A method for producing a porous carbon sheet, which comprises the steps of: forming a precursor fiber sheet containing short carbon fibers and a thermosetting resin, with a heat and forming treatment, and carbonizing the thermosetting resin contained in a heated and formed precursor fiber sheet formed by the forming step, with a heat treatment, wherein a unit area weight of the short carbon fibers in the precursor fiber sheet is in the range of 15 to 30 g/m$^2$ and a unit area weight of the thermosetting resin in the precursor fiber sheet is in the range of 30 to 80 g/m$^2$, and wherein, in the forming step, the precursor fiber sheet is formed by hot plates having a certain clearance provided between the hot plates, wherein the forming step comprises a heating and pressurizing treatment step using a pair of hot plates positioned to be parallel to each other, and wherein the precursor fiber sheet is a long precursor fiber sheet having a length of 10 meters or more and the long precursor fiber sheet is carried intermittently into a space between the hot plates in the forming step in such a manner that the long precursor fiber sheet is carried into the space between the hot plates with a certain feed length which is equal to or less than the length of the hot plates, subsequently the carrying of the long precursor fiber sheet into the space between the hot plates is suspended and the long precursor fiber sheet is treated with heating and pressurizing using the hot plates, and subsequently a next certain feed length next to the certain feed length of the long precursor fiber sheet is carried into the space between the hot plates being carried out from the hot plates with approximately the same length of the next certain feed length of the long precursor fiber sheet.

2. The method for producing a porous carbon sheet according to claim 1, wherein, in the forming step, the clearance is formed with spacers disposed in contact with at least one of the hot plates.

3. The method for producing a porous carbon sheet according to claim 1, wherein a ratio of the weight of the thermosetting resin to the weight of the short carbon fibers in the precursor fiber sheet supplied to the forming step is in the range of 1 to 3.

4. The method for producing a porous carbon sheet according to claim 1, wherein the clearance in the forming step is set to ensure that a density of the short carbon fibers becomes in the range of 0.05 to 0.10 g/cm$^3$ while a density of the thermosetting resin becomes in the range of 0.10 to 0.27 g/cm$^3$ respectively in the precursor fiber sheet after the heat and forming treatment in the forming step.

5. The method for producing a porous carbon sheet according to claim 1, wherein an average fiber diameter of the short carbon fibers in the precursor fiber sheet supplied to the forming step is in the range of 5 to 20 μm.

6. The method for producing a porous carbon sheet according to claim 1, wherein the precursor fiber sheet supplied to the forming step contains a carbonaceous powder.

7. The method for producing a porous carbon sheet according to claim 1, wherein in the carbonizing step, the precursor fiber sheet is continuously run in a heating furnace internally kept in an inert atmosphere and heated at least up to 1,200° C. at a heating rate in the range of 100 to 10,000° C./min in the heating furnace, to carbonize the thermosetting resin while heat-treating the precursor fiber sheet in the heating furnace, and wherein the porous carbon sheet obtained after completion of the carbonizing step is wound as a roll.

8. A method for producing a porous carbon sheet, which comprises the steps forming a precursor fiber sheet containing short carbon fibers and a thermosetting resin, with a heat and forming treatment, and carbonizing the thermosetting resin contained in a heated and formed precursor fiber sheet formed by the forming step, with a heat treatment, wherein a unit area weight of the short carbon fibers in the precursor fiber sheet is in the range of 15 to 30 g/m$^2$ and a unit area weight of the thermosetting resin in the precursor fiber sheet is in the range of 30 to 80 g/m$^2$, and wherein, in the forming step, the precursor fiber sheet is formed by hot plates having a certain clearance provided between the hot plates, wherein in the carbonizing step, the precursor fiber sheet is continuously run in a heating furnace internally kept in an inert atmosphere and heated at least up to 1,200° C. at a heating rate in the range of 100 to 10,000° C./min in the heating furnace, to carbonize the thermosetting resin while heat-treating the precursor fiber sheet in the heating furnace, and wherein the porous carbon sheet obtained after completion of the carbonizing step is wound as a roll, wherein a bending member for bending the precursor fiber sheet in the longitudinal direction while the precursor fiber sheet is run is installed in the heating furnace in the carbonizing step, so that the precursor fiber sheet can be run in contact with the bending member.

9. The method for producing a porous carbon sheet according to claim 8, wherein a temperature in the heating furnace having the bending member installed therein is in the range of 400 to 2,700° C.

10. The method for producing a porous carbon sheet according to claim 9, wherein the heating furnace having the bending member installed therein is a heating furnace having a temperature region in the range of 400 to 800° C.

11. The method for producing a porous carbon sheet according to claim 9, wherein the heating furnace having the bending member installed therein is a heating furnace having a temperature region in the range of 1,600 to 2,700° C.

12. The method for producing a porous carbon sheet according to claim 8, wherein when the precursor fiber sheet is run while it is bent by the bending member in the longitudinal direction, the bending angle is in the range of 5 to 25°.

13. The method for producing a porous carbon sheet according to claim 8, wherein both of the front and rear surfaces of the precursor fiber sheet are brought into contact with the bending members one after another, so that both of the surfaces of the precursor fiber sheet receive bending.

\* \* \* \* \*